(12) United States Patent
Gartstein et al.

(10) Patent No.: US 6,835,491 B2
(45) Date of Patent: Dec. 28, 2004

(54) BATTERY HAVING A BUILT-IN CONTROLLER

(75) Inventors: Vladimir Gartstein, Cincinnati, OH (US); Dragan Danilo Nebrigic, Indian Springs, OH (US)

(73) Assignee: The Board of Trustees of the University of Illinois, Chicago, IL (US)

( * ) Notice: Subject to any disclaimer, the term of this patent is extended or adjusted under 35 U.S.C. 154(b) by 0 days.

(21) Appl. No.: 09/275,495

(22) Filed: Mar. 24, 1999

(65) Prior Publication Data

US 2002/0001745 A1 Jan. 3, 2002

Related U.S. Application Data

(60) Provisional application No. 60/080,427, filed on Apr. 2, 1998.

(51) Int. Cl.[7] .................... H01M 10/48; H01M 2/00; H02J 7/00
(52) U.S. Cl. ................ 429/92; 429/61; 429/90; 429/91; 320/132; 320/134
(58) Field of Search ................ 429/61, 90, 91, 429/92; 320/2, 132, 134

(56) References Cited

U.S. PATENT DOCUMENTS

| | | | |
|---|---|---|---|
| 4,084,124 A | 4/1978 | Kapustka | 320/9 |
| 4,105,962 A | 8/1978 | Scott, Jr. et al. | 320/32 |
| 4,121,115 A | 10/1978 | de Méré | 307/150 |
| 4,209,736 A | 6/1980 | Reidenbach | 320/22 |
| 4,289,836 A | 9/1981 | Lemelson | 429/61 |
| 4,296,461 A | 10/1981 | Mallory et al. | 363/22 |
| 4,418,127 A | * 11/1983 | Shambaugh | 429/8 |
| 4,433,278 A | 2/1984 | Lowndes et al. | 320/48 |
| 4,451,743 A | 5/1984 | Suzuki et al. | 307/110 |
| 4,542,330 A | 9/1985 | Terbrack | 323/222 |
| 4,553,081 A | 11/1985 | Koenck | 320/43 |
| 4,563,627 A | 1/1986 | Orban | 320/19 |
| 4,611,161 A | 9/1986 | Barker | 320/2 |

(List continued on next page.)

FOREIGN PATENT DOCUMENTS

| | | | | |
|---|---|---|---|---|
| EP | 0 546 872 | 6/1993 | | H02J/7/10 |
| EP | 0 653 798 | 5/1995 | | H01M/10/46 |
| EP | 0 653 841 | 5/1995 | | H03K/17/16 |

(List continued on next page.)

OTHER PUBLICATIONS

Allen, Charlie, CMOS curbs the appetite of power–hunger dc–dc converter chips, Electronic Design, Nov. 14, 1985, pp. 174–179.

(List continued on next page.)

Primary Examiner—Patrick Ryan
Assistant Examiner—Julian Mercado
(74) Attorney, Agent, or Firm—Welsh & Katz, Ltd.

(57) ABSTRACT

A multiple-cell battery having a built-in controller is disclosed that extends the run time of the battery. The controller may extend the run time of the battery, for example, by converting the cell voltage to an output voltage that is greater than a cut-off voltage of an electronic device, by converting the cell voltage to an output voltage that is less than the nominal voltage of the electrochemical cell of the battery, or by protecting the electrochemical cell from current peaks. The controller may also include a ground bias circuit that provides a virtual ground so that a converter may operate at lower cell voltages. The battery may be a single-cell battery, a universal single-cell battery, a multiple-cell battery or a multiple-cell hybrid battery. The individual cells of the multiple-cell battery may be connected in series or parallel. In addition, the individual cells may have a controller in each cell that is capable of performing one or more functions to extend the run time of the cell.

27 Claims, 15 Drawing Sheets

U.S. PATENT DOCUMENTS

| | | | | |
|---|---|---|---|---|
| 4,633,379 | A | 12/1986 | Oda et al. | 363/19 |
| 4,686,444 | A | 8/1987 | Park | 320/31 |
| 4,716,354 | A | 12/1987 | Hacker | 320/39 |
| 4,727,006 | A | 2/1988 | Malinowski et al. | 429/50 |
| 4,737,702 | A | 4/1988 | Koenck | 320/40 |
| 4,771,226 | A | 9/1988 | Jones | 323/303 |
| 4,816,737 | A | 3/1989 | Delmas et al. | 320/35 |
| 4,818,928 | A | 4/1989 | Schosser | 320/2 |
| 4,845,419 | A | 7/1989 | Hacker | 320/39 |
| 4,998,056 | A | 3/1991 | Cole | 320/35 |
| 5,006,881 | A | 4/1991 | Kodama | 354/484 |
| 5,032,825 | A | 7/1991 | Kuznicki | 340/636 |
| 5,045,768 | A | 9/1991 | Pelly | 320/2 |
| 5,161,097 | A | 11/1992 | Ikeda | 363/124 |
| 5,168,206 | A | 12/1992 | Jones | 320/31 |
| 5,204,608 | A | 4/1993 | Koenck | 320/2 |
| 5,206,097 | A | 4/1993 | Burns et al. | 429/90 |
| 5,216,371 | A | 6/1993 | Nagai | 324/428 |
| 5,218,284 | A | 6/1993 | Burns et al. | 320/14 |
| 5,245,269 | A | 9/1993 | Tooley et al. | 320/35 |
| 5,247,238 | A | 9/1993 | Yang | 320/35 |
| 5,248,929 | A | 9/1993 | Burke | 320/48 |
| 5,258,239 | A | 11/1993 | Kobayashi | 429/27 |
| 5,264,301 | A | 11/1993 | Sindorf et al. | 429/53 |
| 5,280,420 | A | 1/1994 | Rapp | 363/60 |
| 5,296,765 | A | 3/1994 | Williams et al. | 307/572 |
| 5,304,431 | A | 4/1994 | Schumm, Jr. | 429/27 |
| 5,339,236 | A | 8/1994 | Tamagawa | 363/59 |
| 5,343,088 | A | 8/1994 | Jeon | 307/296.2 |
| 5,355,073 | A | 10/1994 | Nguyen | 320/15 |
| 5,394,365 | A | 2/1995 | Tsukikawa | 365/189.09 |
| 5,422,558 | A * | 6/1995 | Stewart | 320/7 |
| 5,446,367 | A | 8/1995 | Pinney | 323/266 |
| 5,449,569 | A | 9/1995 | Schumm, Jr. | 429/27 |
| 5,451,533 | A | 9/1995 | Williams et al. | 437/41 |
| 5,499,183 | A | 3/1996 | Kobatake | 363/59 |
| 5,541,016 | A | 7/1996 | Schumm, Jr. | 429/27 |
| 5,541,489 | A | 7/1996 | Dunstan | 320/2 |
| 5,541,490 | A | 7/1996 | Sengupta et al. | 320/14 |
| 5,550,452 | A | 8/1996 | Shirai et al. | 320/2 |
| 5,557,188 | A | 9/1996 | Piercey | 320/5 |
| 5,560,999 | A | 10/1996 | Pedicini et al. | 429/27 |
| 5,561,361 | A | 10/1996 | Sengupta et al. | 320/14 |
| 5,563,004 | A | 10/1996 | Buzzelli et al. | 429/27 |
| 5,565,759 | A | 10/1996 | Dunstan | 320/48 |
| 5,583,415 | A | 12/1996 | Fernandez et al. | 320/15 |
| 5,590,419 | A | 12/1996 | Shimo | 455/127 |
| 5,591,212 | A | 1/1997 | Keimel | 607/5 |
| 5,592,069 | A | 1/1997 | Dias et al. | 320/30 |
| 5,600,230 | A | 2/1997 | Dunstan | 320/48 |
| 5,606,242 | A | 2/1997 | Hull et al. | 320/48 |
| 5,610,450 | A | 3/1997 | Saeki et al. | 307/46 |
| 5,619,430 | A | 4/1997 | Nolan et al. | 364/557 |
| 5,633,573 | A | 5/1997 | van Phuoc et al. | 320/5 |
| 5,645,949 | A | 7/1997 | Young | 429/7 |
| 5,646,508 | A | 7/1997 | van Phuoc et al. | 320/30 |
| 5,656,876 | A | 8/1997 | Radley et al. | 307/150 |
| 5,675,232 | A | 10/1997 | Koenck | 320/2 |
| 5,689,178 | A | 11/1997 | Otake | 323/282 |
| 5,694,024 | A | 12/1997 | Dias et al. | 320/30 |
| 5,710,501 | A | 1/1998 | van Phuoc et al. | 320/2 |
| 5,714,863 | A | 2/1998 | Hwang et al. | 320/1 |
| 5,731,686 | A | 3/1998 | Malhi | 320/35 |
| 5,747,189 | A | 5/1998 | Perkins | 429/91 |
| 5,767,659 | A | 6/1998 | Farley | 320/106 |
| 5,783,322 | A | 7/1998 | Nagai et al. | 429/7 |
| 5,825,156 | A | 10/1998 | Patillon et al. | 320/21 |
| 5,831,418 | A | 11/1998 | Kitagawa | 323/222 |
| 5,837,394 | A | 11/1998 | Schumm, Jr. | 429/27 |
| 5,864,182 | A | 1/1999 | Matsuzaki | 257/924 |
| 5,923,544 | A | 7/1999 | Urano | 363/22 |

FOREIGN PATENT DOCUMENTS

| | | | | |
|---|---|---|---|---|
| EP | 0 624 944 | | 7/1998 | H02J/7/36 |
| GB | 2 270 793 | | 3/1994 | H01M/10/44 |
| GB | 2 271 228 | A * | 6/1994 | H02J/7/04 |
| JP | 61-294754 | | 12/1986 | H01M/2/02 |
| JP | 10-262365 | | 9/1998 | H02M/3/155 |
| JP | 10-284099 | | 10/1998 | H01M/8/04 |
| JP | 10-285809 | | 10/1998 | H02J/7/00 |
| JP | 10-285820 | | 10/1998 | H02J/7/10 |
| RU | 726608 | | 5/1980 | H01M/10/48 |
| WO | WO 93/23887 | | 11/1993 | H01M/8/10 |
| WO | WO 94/00888 | | 1/1994 | H01M/10/48 |
| WO | WO 97/13189 | | 4/1997 | G06F/1/26 |
| WO | WO 97/18588 | | 5/1997 | H01L/27/02 |

OTHER PUBLICATIONS

Allen, Charlie, DC/DC chip for low power circuit efficiency, Electronic Product Design, 8/96, pp. 29–32.

Arbetter, Barry and Maksimovic, Dragan, Control Method for Low–Voltage DC Power Suppy in Battery–Powered Systems with Power Management, IEEE 1997, pp. 1198–1204.

Goodenough, Frank, Off–Line and One–Cell IC Converters Up Efficiency, Electronic Design, Jun. 27, 1994, pp. 55–64.

Iwata, T. Yamauchi, H. Akamatsu, Y. Terada, A. Matsuzawa, Gate–Over Driving CMOS Architecture for 0.5V Single–Power–Supply–Operated Devices, IEEE 1997, pp. 290–291 and 473.

McClure, M., Constant Input Power Modulation Technique for High Efficiency Boost Converter Optimized for Lithium–Ion Battery Applications, IEEE 1996, pp. 850–855.

Mohandes, B., MOSFET Synchronous Rectifiers Achieve 90& Efficiency—Part II, PCIM, Jul. 1991 pp. 55–61.

Moore, B., Regulator topologies standardize battery–powered systems, EDN, Jan. 20, 1994, pp. 59–64.

Neil, C., Smart Battery Power, Australian Electronics Engineering, Apr. 1996, pp. 34–38.

Travis, B., Low–voltage power sources keep pace with plummeting logic and $\mu$P voltages, EDN, Sep. 26, 1996, pp. 51–62.

Williams, R., Mohandes, B. and Lee, C., High–Frequency DC/DC Converter for Lithium–Ion battery Applications Utilizes Ultra–Fast CBiC/D Process Technology, IEEE 1995, pp. 322–332.

Yamauchi, H, Iwata, T., Akamatus, H. and Matsuzawa, A., A 0.5V/100MHz Over–Vcc Grounded Data Storage (OVGS) SRAM Cell Architecture With Boosted Bit–line and offset Source Over–Driving Schemes, 1996 International Symposium on Low Power Electronics and Design, 8/12–14/96, pp. 49–54.

Zhou, X., Wang, T. and Lee, F., Optimizing Design for Low Voltage DC–DC Converters, IEEE 1997, pp. 612–616.

Aguilar, C., Canales, F., Arau, J., Sebastian, J. and Uceda, J., An Integrated Battery Charger/Discharger with Power–Factor Correction, IEEE Transactions on Industrial Electronics, Oct. 1997, pp. 597–603.

Favrat, P., Paratte, L., Ballan, H. Declercq, M. and deRooij, N., A 1.5–V–Supplied CMOS ASIC for th Actuation of an Electrostatic Micromotor, IEEE/ASME Transactions on Mechatronics, Sep. 1997, pp. 153–160.

Wolfgang, G. and Lindemann, R., New Topology for High Efficient DC/DC Conversion, Power Conversion, May 1996, pp. 503–512.

Lachs, W., Sutanto, D. and Logothetis, D., Power System Control in the Next Century, IEEE Transactions on Power Systems, Feb. 1996, pp. 11–18.

Wells, Eddy, Integrated Boost Controller Extends alkaline usage, Electronic Design, Nov. 17, 1997, v. 45, n.25, p. S54(1).

Stratakos, Anthony, High–Efficiency Low–Voltage DC–DC Conversion for Portable Applicati ns, University of California, Berkeley, Department of EECS, http://bob.eecs.berkeley.edu.

Alfano, Don, Dc/Dc converters for battery–operated systems: Charge pump or switcher?, Electronic Products, Aug. 1996.

Douseki, Takakuni, et al., A 0.5–V MYCMOS/SIMOX Logic Gate, IEEEE Journal of Solid–State Circuits, v. 32, No. 10, pp. 1604–1609, Oct. 1997.

Wang, Chi–Chang, et al., Efficiency Improvement in Charge Pump Circuits, IEEE Journal of Solid State Circuits, vol. 32, No. 6, Jun. 1997, pp. 852–860.

Sherman, Len, DC/DC converters adapt to the needs of low–power circuits, EDN, Jan. 7, 1998, pp. 145–152.

Heacock, David, and Freeman, David, Capacity Monitoring in Advanced Battery Chemistri s, IEEE, 1995 (0–7803–2459–5/95).

Matsuya, Yasuyuki, et al., Low–Voltage Supply A/D, D/A Conversion Technology, Institute f Electronics, Information and Communications, Engineers Technical Report of IEICE, Aug. 1994.

Yamasaki, Mikio, et al., High–efficiency power source with low input voltage, National Meeting Fall 1989, Institute of Electronics and Communication Engineers of Japan, pp. 3–276; 277.

Kida, Junzo, et al., Performance of DC–DC converter under battery load, Doshisha University, PE 90 37, Serial No. 0005, pp. 29–35.

Tsukamota, Kazuo, et al., Low–power dissipation technology of control circuit for battery–input–type power source, Technical Report of IEICE, PE 94–71 (Mar. 1995), The Institute of Electronics, Information and Communication Engineers.

\* cited by examiner

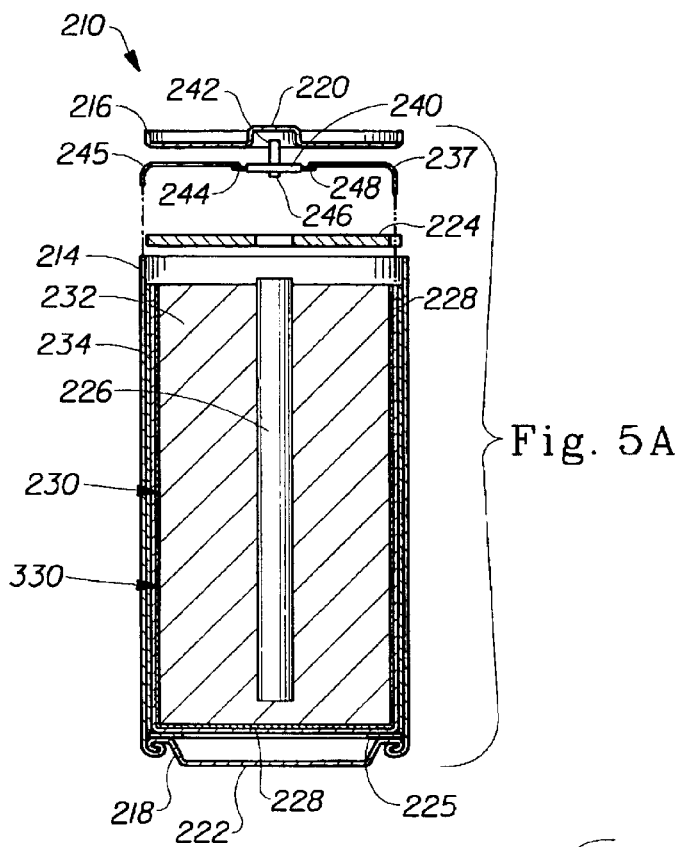
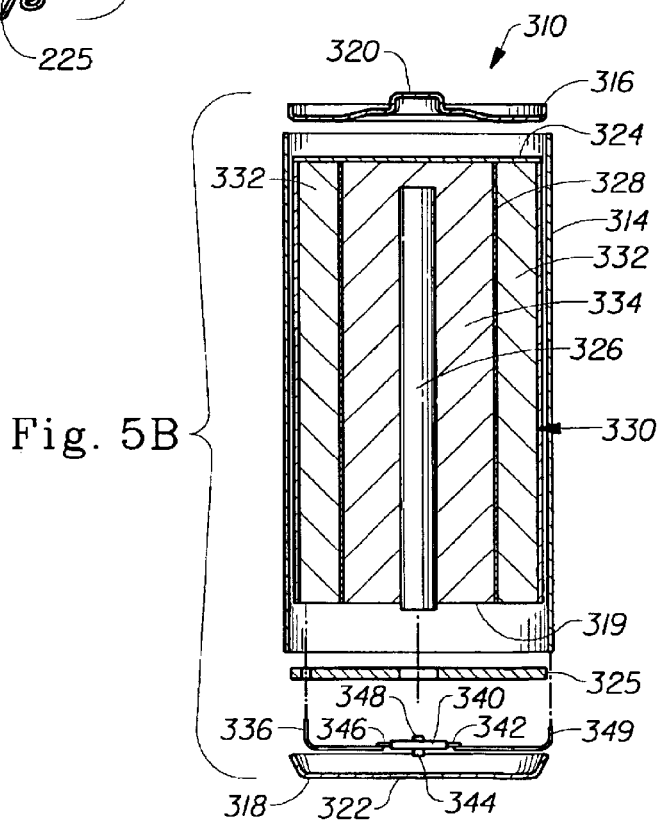

US 6,835,491 B2

BATTERY HAVING A BUILT-IN CONTROLLER

This application claims the benefit of Provisional Application No. 60/080,427, filed Apr. 2, 1998.

FIELD OF THE INVENTION

The present invention relates to batteries and more particularly to batteries having a built-in controller to extend the battery service run time.

BACKGROUND OF THE INVENTION

Consumers use primary and rechargeable (secondary) batteries in portable electronic devices such as radios, compact disc players, cameras, cellular phones, electronic games, toys, pagers and computers devices. When the service run time of a primary battery is over, the battery is usually thrown away. The service run time of a typical primary battery generally only permits usage of between approximately 40 and 70% of the total battery storage capacity. Once that portion of the initial stored energy has been used, the battery generally cannot supply enough voltage to drive a typical electronic circuit. When the useful life of these batteries is spent, the consumers usually throw the batteries away even though the battery still contains between approximately 30 and 60% of its storage capacity. Thus, extending the service run time of a primary battery by allowing a safe deeper discharge will reduce waste by allowing the electronic devices to use more of the storage capacity of the battery before throwing it away.

The overall life of a rechargeable battery, however, is primarily dependent upon the number of and the efficiency of the charge cycles. Rechargeable batteries may be charged and reused after each discharge cycle. As with a primary battery, after a percentage of the battery storage capacity has been used, the battery typically cannot supply enough voltage to drive an electronic circuit. Thus, each discharge cycle of a rechargeable battery may be extended if a deeper discharge of the battery is provided. The level of discharge of a rechargeable battery, however, has an impact on the number of and the efficiency of future charges of the rechargeable battery. In general, as the depth of discharge of a rechargeable electrochemical cell increases, the number of charge cycles that a rechargeable electrochemical cell may undergo decreases. The optimal discharge characteristics of particular types of rechargeable electrochemical cells, however, vary widely. In a Nickel Cadmium ("NiCd") battery, for example, a deep discharge is preferred because the battery may otherwise develop a "memory" effect if the battery is charged without being appropriately depleted resulting in a decreased capacity available for future charges. Deep discharge of a lithium battery, however, may damage the electrochemical cells. The service run time of a rechargeable electrochemical cell may generally be extended better by efficiently controlling the discharge and charge cycles of the particular cell such that the total number of charge cycles may be maximized and the amount of energy recovered from each discharge cycle of the electrochemical cell is also optimized.

In addition, consumers constantly demand smaller and lighter portable electronic devices. One of the primary obstacles to making these devices smaller and lighter is the size and weight of the batteries required to power the devices. In fact, as the electronic circuits get faster and more complex, they typically require even more current than they did before, and, therefore, the demands on the batteries are even greater. Consumers, however, will not accept more powerful and miniaturized devices if the increased functionality and speed requires them to replace or recharge the batteries much more frequently. Thus, in order to build faster and more complex electronic devices without decreasing their useful life, the electronic devices need to use the batteries more efficiently and/or the batteries themselves need to provide greater utilization of stored energy.

Some more expensive electronic devices include a voltage regulator circuit such as a switching converter (e.g., a DC/DC converter) in the devices for converting and/or stabilizing the output voltage of the battery. In these devices, multiple single-cell batteries are generally connected in series, and the total voltage of these batteries is converted into a voltage required by the load circuit by a converter. A converter can extend the run time of the battery by stepping down the battery output voltage in the initial portion of the battery discharge where the battery would otherwise supply more voltage, and therefore more power, than the load circuit requires, and/or by stepping up the battery output voltage in the latter portion of the battery discharge where the battery would otherwise be exhausted because the output voltage is less than the load circuit requires.

The approach of having the converter in the electronic device, however, has several drawbacks. First, the converters are relatively expensive to place in the electronic devices because every device manufacturer has specific circuit designs that are made in a relatively limited quantity and, thus, have a higher individual cost. Second, battery suppliers have no control over the type of converter that will be used with a particular battery. Therefore, the converters are not optimized for the specific electrochemical properties of each type of electrochemical cell. Third, different types of electrochemical cells such as alkaline and lithium cells have different electrochemical properties and nominal voltages and, therefore, cannot be readily interchanged. Additionally, the converters take up valuable space in the electronic devices. Also, some electronic devices may use linear regulators instead of more efficient switching converters such as a DC/DC converter. In addition, electronic devices containing switching converters may create electromagnetic interference (EMI) that may adversely affect adjacent circuitry in the electronic device such as a radio frequency (RF) transmitter. By placing the converter in the battery, however, the source of the EMI can be placed farther away from other EMI sensitive electronics and/or could be shielded by a conductive container of the battery.

Another problem with present voltage converters is that they typically need multiple electrochemical cells, especially with respect to alkaline, zinc-carbon, nickel cadmium (NiCd), nickel metal hydrate (NiMH), and silver oxide batteries, in order to provide enough voltage to drive the converter. In order to avoid this problem, present converters usually require multiple electrochemical cells connected in series to provide enough voltage to drive the converter, which may then step the voltage down to a level required by the electronic device. Thus, due to the converter's input voltage requirements, the electronic device must contain several electrochemical cells, even though the electronic device itself may only require a single cell to operate. This results in wasted space and weight and prevents further miniaturization of the electronic devices.

Thus, a need exists to optimally use the stored charge of a rechargeable battery and optimize the depth of discharge before charging the battery in order to maximize its service run time. By designing batteries to provide a greater utilization of their stored energy, electronic devices can also use smaller or fewer batteries in order to further miniaturize portable electronic devices.

SUMMARY OF THE INVENTION

The present invention provides a battery that provides a longer service run time by optimally using the stored charge of a primary or a rechargeable battery before charging. The battery has a built-in controller that includes a converter, which may be capable of operating below the voltage threshold of typical electronic devices. The controller more efficiently regulates the voltage of the electrochemical cell and allows for a controlled discharge or an optimal discharge depth in order to extend the service run time of the battery. The controller is preferably disposed on a mixed-mode silicon chip that is custom designed for operation with a particular type of electrochemical cell such as an alkaline, nickel cadmium ("NiCd"), nickel metal hydrate ("NiMH"), lithium, lithium ion, sealed lead-acid ("SLA"), silver oxide or hybrid cell or with a particular electronic device.

The controller monitors and controls power delivery to the load to optimally extend the battery service run time by (1) turning on and off the DC/DC converter; (2) maintaining a minimum required output voltage when the input voltage is below that which typical electronic devices can operate; (3) lowering the battery output impedance; (4) determining the optimal discharge depth; (5) providing an optimal charge sequence; (6) increasing discharge current that given electrochemical cell can provide without controller; (7) providing high discharge current within cell safety limits even if this current exceeds converter maximum output current using by pass mode; (8) measuring remaining cell capacity; and (9) providing operating control signals to cell capacity indicators/'fuel' gauges.

In a preferred embodiment, a single controller is mounted inside a housing of a multiple cell primary or rechargeable battery (e.g., a standard 9 volt battery). This aspect of the present invention provides several distinct advantages over placing the controller in the electronic device. First, it allows the battery designer to take advantage of particular electrochemical characteristics of a particular type of electrochemical cell. Second, if the device needs a converter only for a battery containing a particular type of electrochemical cell (e.g., lithium) to alter and/or stabilize the battery output voltage and not for a battery containing another type of electrochemical cell (e.g., NiCd, SLA), and the converter is integrated with the battery that requires the converter (i.e., the lithium battery), the electronic device may be designed without the DC/DC converter. This will allow for smaller circuit designs and prevent losses associated with the converter from affecting the battery that does not need the converter.

In a particularly preferred embodiment, the controller is mounted inside the container of a single-cell battery such as a AAA, AA, C, D or prismatic battery, or inside the container of each cell of a multiple-cell battery such as a prismatic or a standard 9 volt battery. This aspect of the present invention provides the advantages listed above for placing a single controller in a multiple-cell battery and provides even more advantages. First, it allows the controller to be custom matched to particular type of electrochemical cell to take advantage of its particular electrochemical reactions. Second, it allows for batteries having different types of electrochemical cells to be used interchangeably by either altering or stabilizing the output voltage or internal impedance to meet the requirements of electronic devices designed to operate on a standard battery. Both of these advantages, for example are met in a super efficient lithium cell that meets the packaging and electrical requirements of a standard 1.5 volt AA battery by using a built-in controller to step down the nominal cell voltage from the range from about 2.8 to about 4.0 volts to an output voltage of about 1.5 volts. By utilizing the higher cell voltage of a lithium cell, the designer can substantially increase the battery run time. Also, providing a controller in each battery cell provides a much more effective control over every cell than is presently available. The controller may monitor and control discharge conditions in each primary electrochemical cell and can ensure that each cell is completely exhausted before the electronic device shuts down. The controller may also monitor or control the discharge cycle in each rechargeable electrochemical cell to ensure that the cell is discharged to a level that will provide the longest possible service run time of the battery and will improve the safety of the cell to prevent conditions such as memory effects, short circuits or harmful deep discharges. The controller may also directly monitor and control the charge cycle of each rechargeable electrochemical cell that is in a battery to prevent conditions such as overcharging or short-circuiting to increase the cycle life and improve the safety of the battery. The charge state of single cells can also be signaled to consumers directly (visual, audio, vibration etc. indicators) or via 'smart' device interface.

The controllers also allow universal use of the batteries of the present invention. The batteries of the present invention provide advantages over known batteries regardless of whether they are used with electric, electromechanical, or electronic devices that have a cut-off voltage such as the ones listed above or with an electric device. In case of electrical, electromechanical, and electronic devices or appliances the batteries of present invention will maintain their peak performance until the very end of the batteries service run time. Utilizing controller with the battery the tail of the actual voltage versus time discharge curve could be profiled in such way so that it could emulate the typical discharge profile (without instantaneous end of service).

The controller chips can also be made much more economically because the large volume of battery sales allows for much less expensive production of the chips than individual regulator or converter designs can be made for each type of electronic device.

A preferred embodiment of the DC/DC converter is a high efficiency, ultra low input voltage, and medium power converter that utilizes a pulse-width, or -phase shift modulation, and pulse skip low duty control scheme with the start-stop oscillator control scheme.

Other features and advantages of the present invention are described with respect to the description of a preferred embodiment of the invention.

BRIEF DESCRIPTION OF THE DRAWINGS

While the specification concludes with claims particularly pointing out and distinctly claiming the subject matter that is regarded as the present invention, it is believed that the invention will be better understood from the following description, which is taken in conjunction with the accompanying drawings.

FIG. 5A is a partially exploded, sectional view of a preferred embodiment of a battery of the present invention.

FIG. 5B is a partially exploded, sectional view of another preferred embodiment of a battery of the present invention.

DETAILED DESCRIPTION OF THE INVENTION

Figure 1:
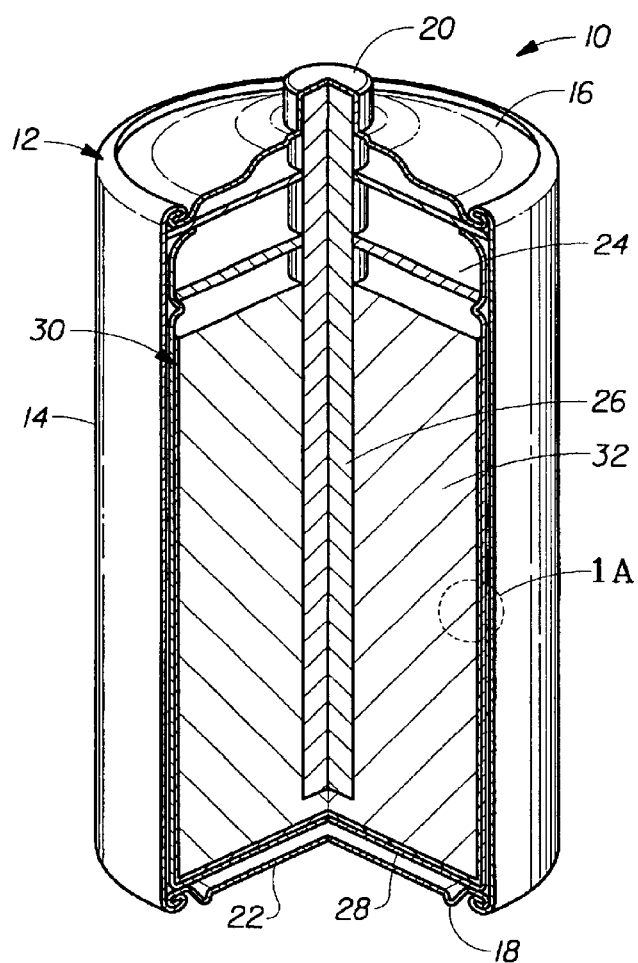
FIG. 1 is a perspective view of a typical cylindrical battery structure.
Figure 1A:
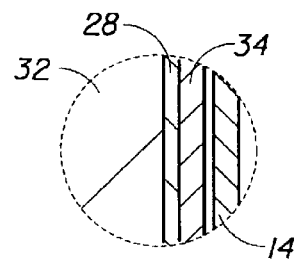

The present invention relates to single-cell and multiple-cell batteries. The batteries of the present invention can be either primary or rechargeable. The term "primary" is used in this application and refer to a battery or an electrochemical cell that is intended to be discarded after its usable electrical storage capacity has been depleted (i.e., it is not intended to be recharged or otherwise reused). The terms "rechargeable" and "secondary" are used interchangeably in this application and refer to a battery or an electrochemical cell that is intended to be recharged at least once after its usable electrical storage capacity has been depleted (i.e., it is intended to be reused at least once). The term "consumer" in this application refers to a battery that is intended to be used in an electronic or electric device purchased or used by a consumer. The term "single-cell" refers to a battery having a single electrochemical cell packaged individually such as a standard AA, AAA, C or D type battery, or a single-cell in a multiple-cell battery (e.g., such as a standard 9 volt battery or a battery for a cellular telephone or laptop computer). The term "battery," as used in this application, refers to a container having terminals and a single electrochemical cell, or a housing that has terminals and at least substantially contains two or more electrochemical cells (e.g., a standard 9 volt battery or a battery for a cellular telephone or laptop computer). The electrochemical cells need not be completely enclosed by the housing if each cell has its own individual container. A portable telephone battery, for example, may contain two or more electrochemical cells that each have their own individual containers and are packaged together in a shrink-wrap plastic material that holds the individual containers together but may not completely enclose the individual containers of the cells.

As used in this application, the term "hybrid battery" includes a multiple-cell battery that contains two or more voltaic cells of which at least two of those cells have different voltaic mechanisms such as photovoltaic, fuel, thermal, electrochemical, electromechanical, etc. or a different electrode, a different pair of electrodes or a different electrolyte. As used in this application term, "battery cell" is used to refer generally to voltaic cells used in a battery, including electrochemical cells. Also, voltaic or electrovoltaic cell is used interchangeably and describes various physical mechanisms of generation of electricity including chemical. In addition, a hybrid cell may contain additional energy storage elements improving cell voltage and current discharge characteristics such as a super or ultra capacitor, high efficiency inductor, or low capacity secondary cell. The hybrid cell elements can be made to replace inactive cell construction elements such as label, seal, hollow terminals, etc.

The term "controller" as used in this application refers to a circuit that accepts at least one input signal and provides at least one output signal that is a function of the input signal. The terms "DC/DC converter" and "converter," are used interchangeably in this application and refer to a switching-type, i.e., a chopper-controlled DC/DC converter, also known as a DC/AC inverter, that converts an input DC voltage to a required DC output voltage. DC/DC converters are power electronic circuits that often provide a regulated output. The converter may provide a stepped-up voltage level, a stepped-down voltage level or a regulated voltage of about the same level. Many different types of DC/DC converters are well known in the art. The present invention contemplates the use of known converters or linear regulators as possible, though less advantageous, substitutions for the preferred converters described in this application that are capable of operating at low voltage levels below where typical electronic devices can operate.

The "cut-off voltage" of an electronic device is the voltage below which an electric or electronic device connected to a battery cannot operate. Thus, the "cut-off voltage" is device dependent, i.e., the level depends on the minimum operating voltage of the device (the functional endpoint) or the frequency of operation (e.g., must be able to charge capacitor within a given time period). Most electronic devices have a cut-off voltage in the range from about 1 volt to about 1.2 volts, with some of the electronic devices having a cut-off voltage as low as about 0.9 volts. Electric devices that have mechanical moving parts, such as electric clocks, motors and electromechanical relays also have a cut-off voltage that is necessary to provide enough current to create an electromagnetic field strong enough to move the mechanical parts. Other electric devices, such as a flashlight, generally do not have a device cut-off voltage, but as the voltage of the battery powering it decreases, the output power (e.g., bulb intensity) will also decrease.

If a single electrochemical cell is powering a device having a cut-off voltage, the electrochemical cell is "subject to" the cut-off voltage of the device in that the battery must provide an output voltage that is greater than or equal to the cut-off voltage of the device or else the device will shut-off. If two or more electrochemical cells arranged in series, however, are powering the device, i.e., electrically connected between the positive input terminal and the negative input terminal, each electrochemical cell is "subject to" a portion of the cut-off voltage of the device. For example, if two electrochemical cells are connected in series and are powering a device, each cell is "subject to" one-half of the cut-off voltage of the device. If three electrochemical cells are connected in series and are used to power the device, however, each electrochemical cell is only "subject to" one-third of the cut-off voltage of the device. Thus, if a number of cells "n" are connected in series and are powering the device, each cell is "subject to" a portion of the cut-off voltage of the device that may be defined as the cut-off voltage divided by n, where n is an integer. If two or more electrochemical cells are connected in parallel to power the electronic device, however, each cell is still "subject to" the full cut-off voltage of the device. Additionally, in this application, if two or more electrochemical cells are connected in series, and that series connection is connected in parallel with one or more other electrochemical cells, each of the series-connected cells are "subject to" the same portion of the cut-off voltage as if electrochemical cells connected in series were only electrochemical cells powering the device.

One aspect of the present invention is to extend the "service run time" of a battery. For a primary battery, the "battery service run time" and the "battery run time" are interchangeable and are defined as the time of the discharge cycle until the output voltage of the battery drops below the minimum operating voltage of the device that the battery is powering, i.e., the cut-off voltage of that device. While the "cell run time" is dependent upon the electrochemical cell itself, i.e., exhausting all the electrochemical energy of the cell, the "battery run time" is dependent upon the device in which it is used. An electronic device having a cut-off voltage of about 1 volt, for example, will shut down when the battery output voltage drops below 1 volt even though the electrochemical cell may still have at least 50% of its energy storage capacity remaining. In this example, the "battery run time" has elapsed because it can no longer provide high enough voltage to drive the electronic device and the battery is generally thrown away. The "cell run time," however, has not elapsed because the cell has electrochemical energy remaining.

A rechargeable battery, however, has multiple charge/discharge cycles. In a rechargeable battery, the "cycle life" is defined as the number of charge/discharge cycles that can be achieved. The "battery run time" of a rechargeable battery refers to the time of a single discharge cycle until the output voltage of the rechargeable battery drops below the cut-off voltage of the device that the battery is powering or the discharge is stopped to provide a greater cycle life of the battery. The "battery service run time" of a rechargeable battery, however, refers to the total number of charge/discharge cycles in which each discharge cycle has an optimum run time. The "cell run time" of a rechargeable electrochemical cell is the time required for the cell to achieve optimal discharge depth under load conditions during a single discharge cycle of that cell. As discussed above, the "cycle life" of a rechargeable battery is a function of the depth of discharge that the rechargeable cell undergoes. As the depth of discharge increases, the battery run time also increases, but the cycle life and the battery service run time decrease. Conversely, as the depth of discharge decreases, the battery run time also decreases, but the cycle life and the battery service run time increase. From a device usage point of view, however, shorter battery run time is inconvenient. Thus, for each particular electrochemistry and design of a rechargeable battery a ratio between the discharge depth and the cycle life can be optimized to allow for a greater battery service run time. One possible way to optimize the service run time of a rechargeable battery, for example, is to compare the cumulative energy delivered, which may be defined as the product of the cycle life (i.e., number of cycles) achieved at a particular discharge depth and the amount of energy recovered in each of those cycles.

In this application, the terms "useful life of the electrochemical cell" or the "cell useful life" are also used regardless of whether the electrochemical cell is a primary or rechargeable cell, and correspond to the battery run time in that the "cell useful life" is the time until the cell is no longer useful in a particular discharge cycle because the electrochemical cell can no longer provide enough voltage to drive the device that it is powering. If the "cell run time" in a single-cell battery is extended or reduced, then the "cell useful life" and the "battery run time" are also necessarily extended or reduced, respectively. Additionally, the terms "battery run time" of a single-cell battery and "cell useful life" are interchangeable in that if either the "battery run time" of the single-cell battery or the "cell useful life" are extended or reduced, then the other will also be respectively extended or reduced. In contrast, however, the term "cell useful life" of a particular electrochemical cell in a multiple-cell battery is not necessarily interchangeable with the term "battery run time" for that multiple-cell battery because the particular electrochemical cell may still have a remaining useful life even after the battery run time of the multiple-cell battery has elapsed. Likewise, if the "cell run time" of a particular electrochemical cell in a multiple-cell battery is extended or reduced, the "battery run time" is not necessarily extended or reduced because the "battery run time" may depend upon the cell voltage of one or more other cells in the battery.

The "optimal depth of discharge" or "optimal discharge depth" of a rechargeable electrochemical cell as used in this application refers to the cell residual capacity that maximizes the number of charge/discharge cycles and optimizes the run time for each discharge cycle of that cell. The service run time of a rechargeable electrochemical cell may be drastically shortened if the cell is discharged below the "optimal discharge depth" for that cell (e.g., voltage at about 1.6 volts for a SLA cell). A deep discharge of a lithium ion cell, for example, may damage the cell and decrease the number of and the efficiency of future charge cycles of that cell. A nickel cadmium ("NiCd") electrochemical cell, however, is preferably more deeply discharged in order to prevent "memory" effects from shortening the life of the cell by decreasing the run time of that cell in future discharge cycles.

The terms "electrically connected" and "electrical connection" and "electrically coupled" refer to connections or couplings that allow for continuous current flow. The terms "electronically connected" and "electronic connection" refer to connections in which an electronic device such as a transistor or a diode are included in the current path. "Electronic connections" are considered in this application to be a subset of "electrical connections" such that while every "electronic connection" is considered to be an "electrical connection," not every "electrical connection" is considered to be an "electronic connection."

A battery of the present invention includes one or more controllers that extend the service run time of the battery by optimizing the energy recovery in the discharge cycle of a primary or rechargeable battery and, in the case of a rechargeable battery, maximizing the number of discharge cycles. In one embodiment of the present invention, for example, a controller may perform one or more of the following functions: (1) discharge control, (2) charge control, (3) emergency control, disconnecting cell in case of short circuit, reverse polarity, charge (primary cell) or by passing controller if load requires battery safe current that exceeds controller deliverable current rate, (4) signaling cell remaining capacity and critical levels of remaining energy. Electrochemical cell(s) may be packaged in either single-cell or multiple-cell batteries. Multiple-cell batteries may include two or more of the same type of electrochemical cell, or include two or more different types of electrochemical cells in a hybrid battery. The multiple-cell battery of the present invention may contain electrochemical cells electrically arranged in series and/or in parallel. The controller(s) of a single-cell battery may be electrically connected in series and/or parallel with the electrochemical cell(s) inside a container of a cell, and packaged inside a housing that at least partially contains the container of the cell, or attached to the container, the housing, or to a label or any other structure affixed to the container or housing. The controller (s) of a multiple-cell battery may be packaged along with one or more of the individual cells as described with respect to a single-cell battery, and/or may be packaged along with a combination of multiple cells such that the controller is connected in series or in parallel with the combination of electrochemical cells.

The controller of a battery of the present invention may perform one or more of the functions listed above, and may also perform other functions in addition to the functions listed above. A controller of a battery of the present invention may contain one circuit that performs each of the desired functions, or may contain individual sub-controllers that each perform one or more of the desired functions. In addition, the sub-controllers may share circuitry such as sensing circuitry that may provide control signals to the individual sub-controllers.

Throughout the Drawings, the last two digits of a number specifying a component is repeated on other figures for comparable components, differentiated by a one or two digit prefix corresponding to the figure. For example, a container 12 referenced in FIGS. 1–3 is compared to a container 212 in FIG. 5A.

Figure 2:
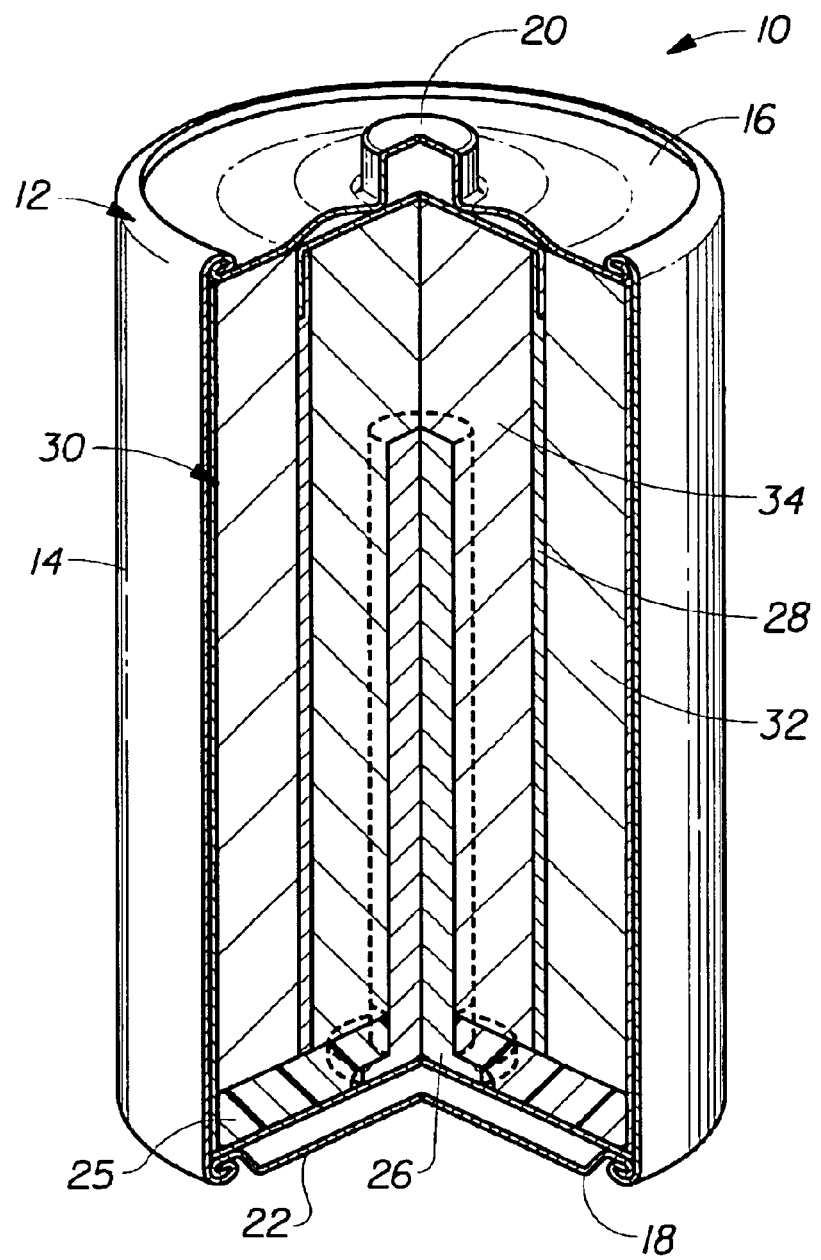
FIG. 2 is a perspective view of another typical cylindrical battery structure.
Figure 3:
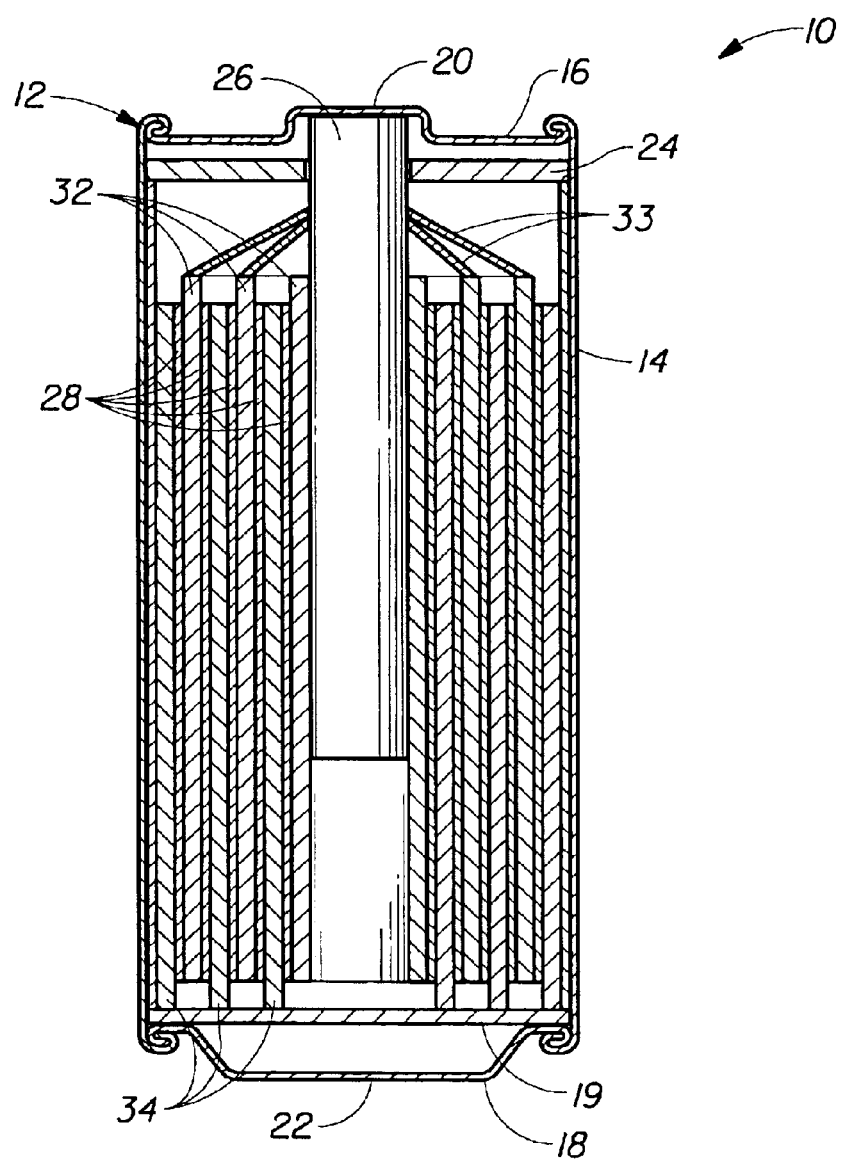
FIG. 3 is a sectional view of yet another typical cylindrical battery structure.

FIGS. 1–3 show typical cylindrical battery 10 structures that are simplified for the purpose of discussion. Each cylindrical battery 10 structure has the same basic structural elements arranged in different configurations. In each case, the structure includes a container 12 having a jacket or side wall 14, a top cap 16 including a positive terminal 20, and a bottom cap 18 including a negative terminal 22. The container 12 encloses a single electrochemical cell 30. FIG. 1 shows a configuration that may be used for a cylindrical, single zinc-carbon electrochemical cell 30 battery 10. In this configuration, the entire top cap 16 is conductive and forms the positive terminal 20 of the battery 10. The insulating washer or seal 24 insulates the conductive top cap 16 from the electrochemical cell 30. The electrode or current collector 26 electrically connects the external positive terminal 20 of the battery 10 and the cathode (positive electrode) 32 of the electrochemical cell 30. The bottom cap 18 is also entirely conductive and forms the external negative terminal 22 of the battery 10. The bottom cap is electrically connected to the anode (negative electrode) 34 of the electrochemical cell 30. Separator 28 is disposed between the anode 34 and cathode 32 and provides the means for ion conduction through the electrolyte. A zinc-carbon battery, for example, is typically packaged in this type of arrangement.

FIG. 2 shows an alternative battery design in which an insulating washer or seal 25 is shown insulating the bottom cap 18 from the electrochemical cell 30. In this case, the entire top cap 16 is conductive and forms the positive terminal 20 of the battery. The top cap 16 is electrically connected to the cathode 32 of the electrochemical cell 30. The bottom cap 18, which is also conductive, forms the negative terminal 22 of the battery. The bottom cap 18 is electrically connected to the anode 34 of the battery cell 30 via the current collector 26. Separator 28 is disposed between the anode and cathode and provides the means for ion conduction through the electrolyte. Primary and rechargeable alkaline (zinc/manganese dioxide) batteries, for example, are typically packaged in this type of arrangement.

FIG. 3 shows another alternative battery design in which the electrochemical cell 30 is formed in a "spirally wound jelly roll" structure. In this design, four layers are disposed adjacent each other in a "laminate-type" structure. This "laminate-type" structure may, for example, contain the following order of layers: a cathode layer 32, a first separator layer 28, an anode layer 34 and a second separator layer 28. Alternatively, the second separator layer 28 that is not disposed between the cathode 32 and the anode 34 layers may be replaced by an insulating layer. This "laminate-type" structure is then rolled into a cylindrical spirally wound jelly roll configuration and placed in the container 12 of the battery 10. An insulating washer or seal 24 is shown insulating the top cap 16 from the electrochemical cell 30. In this case, the entire top cap 16 is conductive and forms the positive terminal 20 of the battery 10. The top cap 16 is electrically connected to the cathode layer 32 of the electrochemical cell 30 via current collector 26 and conductors 33. The bottom cap 18, which is also conductive, forms the negative terminal 22 of the battery. The bottom cap 18 is electrically connected to the anode 34 of the battery cell 30 via conductive bottom plate 19. Separator layers 28 are disposed between the cathode layer 32 and the anode layer 34 and provide the means for ion conduction through the electrolyte. The side wall 14 is shown connected to both the top cap 16 and the bottom cap 18. In this case, the side wall 14 is preferably formed of a non-conductive material such as a polymer. The side wall, however, may also be made of a conductive material such as a metal if the side wall 14 is insulated from at least the positive terminal 20 and/or the negative terminal 22 so that it does not create a short-circuit between the two terminals. Primary and rechargeable lithium batteries such as a primary lithium manganese dioxide (MnO2) battery and rechargeable lithium ion, nickel cadmium (NiCd) and nicket metal hydrate (NiMH) batteries, for example, are often packaged in this type of arrangement.

Each of these cells may also include various forms of safety vents, operating vents for electrochemical cells that need air exchange for operation, capacity indicators, labels, etc., which are well known in the art. In addition, the cells may be constructed in other structures known in the art such as button cells, coin cells, prismatic cells, flat-plate, bipolar-plate, or thick/thin film-based cells, etc.

For the purpose of the present invention, the battery "container" 12 houses a single electrochemical cell 30. The container 12 includes all the elements necessary to insulate and protect the two electrodes 32 and 34, separator and the electrolyte of the electrochemical cell 30 from the environment and from any other electrochemical cells in a multiple-cell battery and to provide electrical energy from the electrochemical cell 30 outside of the container. Thus, the container 12 in FIGS. 1 and 2 includes a side wall 14, top 16 and bottom 18 caps, and positive 20 and negative 22 terminals that provide for electrical connection of the cell 30. In a multiple-cell battery, the container may be an individual structure that contains a single electrochemical cell 30, and this container 12 may be one of multiple individual containers within the multiple-cell battery. Alternatively, the container 12 may be formed by a portion of the housing of a multiple-cell battery if the housing completely isolates the electrodes and the electrolyte of one electrochemical cell 30 from the environment and each other cell in the battery. The container 12 may be made of a combination of conducting material, such as metal, and insulating material, such as a plastic or a polymer.

Figure 6:
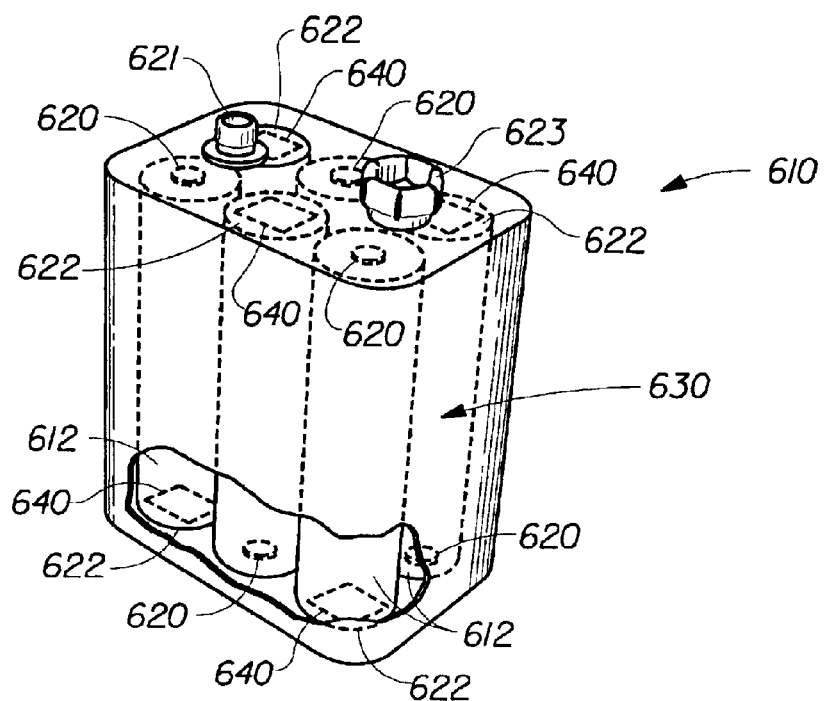
FIG. 6 is a perspective view, partially in section, of a preferred embodiment of a multiple-cell battery of the present invention.

The container 12, however, is to be distinguished from a multiple-cell battery housing that contains separated individually isolated alkaline cells 630 each containing its own electrodes and electrolytes. For example, a standard alkaline 9 volt battery housing encloses six individual alkaline cells 630, each having their own container 612, as shown in FIG. 6. Each alkaline cell 630 has an internal positive terminal 620 connected to an external positive terminal 621 and has an internal negative electrode 622 connected to an external negative terminal 623. Advantageously, each alkaline cell 630 would include a controller 640 operating in a manner described herein. In some lithium 9 volt batteries, however, the housing 611 of the battery is formed such that it has individual chambers that isolate the electrodes and the electrolyte of the electrochemical cells 30, and thus the housing comprises both the individual containers 12 for each cell and the housing 611 for the entire multiple-cell battery 610.

FIG. 6 shows a perspective view, partially in section, of a multiple-cell 9 volt battery 610 of the present invention in which each electrochemical cell 630 has a controller 640 inside the cell's individual container 612. In this embodiment, the battery 610 contains six individual electrochemical cells 630, each having a nominal voltage of approximately 1.5 volts. The battery 610, for example, could also contain three lithium cells, each having a nominal voltage of approximately 3 volts apiece. Other multiple-cell battery constructions are known in the art and may be used to house a controller 640 of the present invention. For example, multiple-cell batteries include prismatic batteries, batteries having individual containers that are at least substantially shrink-wrapped together, plastic housings that contain multiple single-cell containers such as camcorder and cellular phone batteries.

Figure 5C:
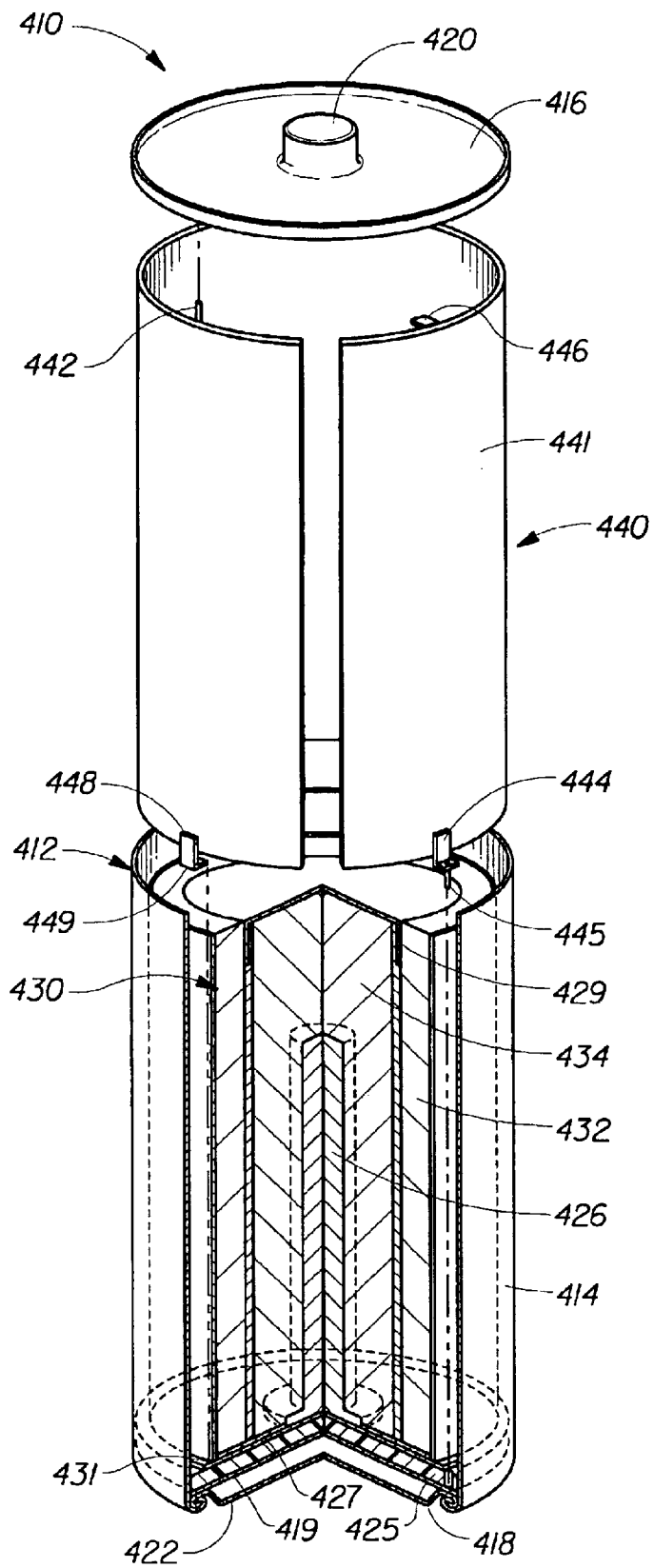
FIG. 5C is a partially exploded, perspective view of yet another preferred embodiment of a battery of the present invention.

FIGS. 5A, 5B and 5C show partially exploded views of three embodiments of the present invention for single-cell cylindrical primary batteries 210, 310, and 410. In FIG. 5A, the controller 240 is placed between the top cap 216 and the insulating washer 224 of the battery 210. The positive output 242 of the controller 240 is electrically connected to the positive terminal 220 of the battery 210, which is directly adjacent to the controller 240, and the negative output 244 of the controller 240 is electrically connected to the negative terminal 222 of the battery 210. In this example, the negative output 244 of the controller 240 is connected to the negative terminal 222 of the battery 210 via conductive strip 245, and conductive side wall 214, which is in electrical contact with negative terminal 222 of the conductive bottom cap 218 of the battery 210. In this case, the conductive side wall must be electrically insulated from the top cap 216. The positive input 246 of the controller 240 is electrically connected to the cathode 232 of the electrochemical cell 230 via current collector 226. The negative input 248 of controller 240 is electrically connected to the anode 234 of the electrochemical cell 230 via conductive strip 237. Alternatively, the controller 240 may be placed between the bottom cap 218 and the insulator 225, or attached, affixed or joined to the outside of the container or the label of the battery. Separator 228 is disposed between the anode conduction through the electrolyte of the electrochemical cell 230.

In FIG. 5B, the controller 340 is placed between the bottom cap 318 and the insulator 325 of the battery 310. The negative output 344 of the controller 340 is electrically connected to the negative terminal 322 of the battery 310, which is directly adjacent to the controller 340, and the positive output 342 of the controller 340 is electrically connected to the positive terminal 320 of the battery 310. In this example, the positive output 342 of the controller 340 is connected to the positive terminal 320 of the battery 310 via conductive side wall 314, which is in electrical contact with positive terminal 320 of the conductive top cap 316 of the battery 310. The positive input 346 of the controller 340 is electrically connected to the cathode 332 of the electrochemical cell 330 via conductive strip 336. The negative input 348 of controller 340 is electrically connected to the anode 334 of the electrochemical cell 330 via current collector 326, which extends from bottom plate 319 into the anode 334 of the electrochemical cell 330. In such cases, the current collector 326 and the negative input 348 of the controller 340 must be insulated from the negative terminal 322 of the container 312 and the negative output 344 of the controller 340 if the controller 340 uses a virtual ground. Alternatively, the controller 340 may be placed between the top cap 316 and the insulator 324, or attached, affixed or joined to the outside of the container 312 or the label of the battery. Separator 328 is disposed between the anode conduction through the electrolyte of the electrochemical cell 330.

In FIG. 5C, the controller 440 is formed on a wrapper 441 using thick film printing technology, or flexible printed circuit boards ("PCBs"), and placed inside the container between the side wall 414 and the cathode 432 of the battery 410. The positive output 442 of the controller 440 is electrically connected to the positive terminal 420 of the battery 410 via top cap 416 of the battery 410, and the negative output 444 of the controller 440 is electrically connected to the negative terminal 422 of the battery 410 via bottom plate 419 and bottom cap 418. The positive input 446 of the controller 440 is electrically connected to the cathode 432 of the electrochemical cell 430, which in this example is directly adjacent to the wrapper 441 containing the controller 440. The negative input 448 of controller 440 is electrically connected to the anode 434 of the electrochemical cell 430 via contact plate 431 and the current collector 426, which extends from contact plate 431 into the anode 434 of the electrochemical cell 430. Insulating washer 427 isolates the contact plate 431 from the cathode 432. As shown in FIG. 5C, the insulating washer may also extend between the anode 434 and contact plate 431 because current collector 426 provides the connection from the anode 434 to the contact plate 431. If the controller 440 uses a virtual ground, the contact plate 431 must also be insulated from the bottom plate 419 and the negative terminal 422 such as by insulating washer 425. Alternatively, the wrapper 441 may also be disposed on the outside of the container 412, wrapped around the outside of the side wall 414. In such embodiments, the label may cover the wrapper, or the label may be printed on the same wrapper as the controller itself.

Figure 4:
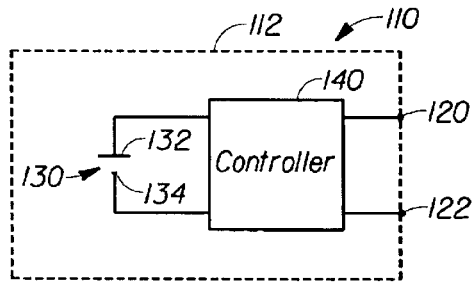
FIG. 4 is a block diagram of a battery of the present invention.
Figure 4A:
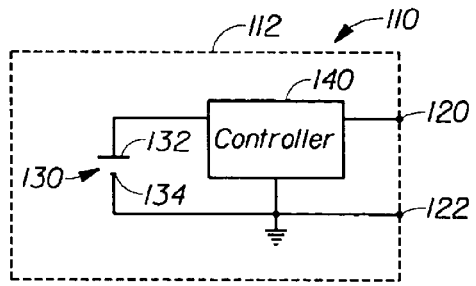
FIG. 4A is a block diagram of one preferred embodiment of the battery shown in FIG. 4.
Figure 4B:
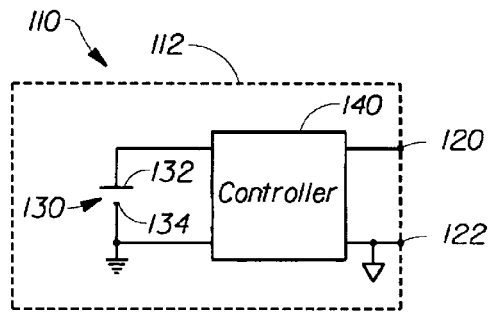
FIG. 4B is a block diagram of another preferred embodiment of the battery shown in FIG. 4.

FIGS. 4, 4A and 4B show block diagrams of different embodiments of the battery 110 of the present invention. FIG. 4 shows a block diagram of one embodiment of a battery 110 of the present invention utilizing an embedded integrated controller circuit 140. This embodiment preferably utilizes a mixed-mode integrated circuit that has both digital and analog components. The controller circuit could alternatively be fabricated using an application specific integrated circuit ("ASIC"), a hybrid chip design, a PC board or any other form of circuit fabrication technology known in the art. The controller circuit 140 may be placed inside the battery container 112 between the positive 132 and negative 134 electrodes of the electrochemical cell 130 and the positive 120 and negative 122 terminals of the battery. Thus, the controller 140 can connect the electrochemical cell 130 to or disconnect the electrochemical cell 130 from the terminals 120 and 122 of the container 112, alter or stabilize the output voltage or the output impedance of the cell 130 that is applied to the battery terminals 120 and 122. FIG. 4A shows one preferred embodiment of the battery 110 of the present invention shown in FIG. 4. In FIG. 4A, the controller 140 is connected between the positive electrode (cathode) 132 of the electrochemical cell 130 and the positive terminal 120 of the battery container 112. The negative electrode (anode) 134 of the electrochemical cell 130 and the negative terminal 122 of the battery container 112 share a common ground with the controller 140. FIG. 4B, however, shows an alternative preferred embodiment of the battery 110 of the present invention in which the controller 140 operates on a virtual ground and isolates the negative electrode 134 of the electrochemical cell 130 from the negative terminal 122 of the container 112 in addition to isolating the positive electrode 132 of the electrochemical cell 130 from the positive terminal 120 of the container 112.

Each of the embodiments shown in FIGS. 4A and 4B has its own advantages and disadvantages. The configuration of FIG. 4A, for example, allows for a simpler circuit design having a common ground for the voltaic cell 130, the controller 140 and the negative terminal 122 of the battery container 112. The configuration of FIG. 4A, however, has the disadvantage of requiring a converter to work under true cell voltage levels and may require the use of an inductor element. In the configuration of FIG. 4B, the virtual ground applied to the negative terminal 122 of the battery container 112 both isolates the negative electrode 134 of the electrochemical cell 130 from the load and allows for the use of a DC/DC converter or charge pump. This configuration, however, has the disadvantage of requiring the increased circuit complexity of a virtual ground in order to allow a voltage converter of the controller 140 to continue to operate more efficiently when the cell voltage is low (<1 V).

Figure 4C:
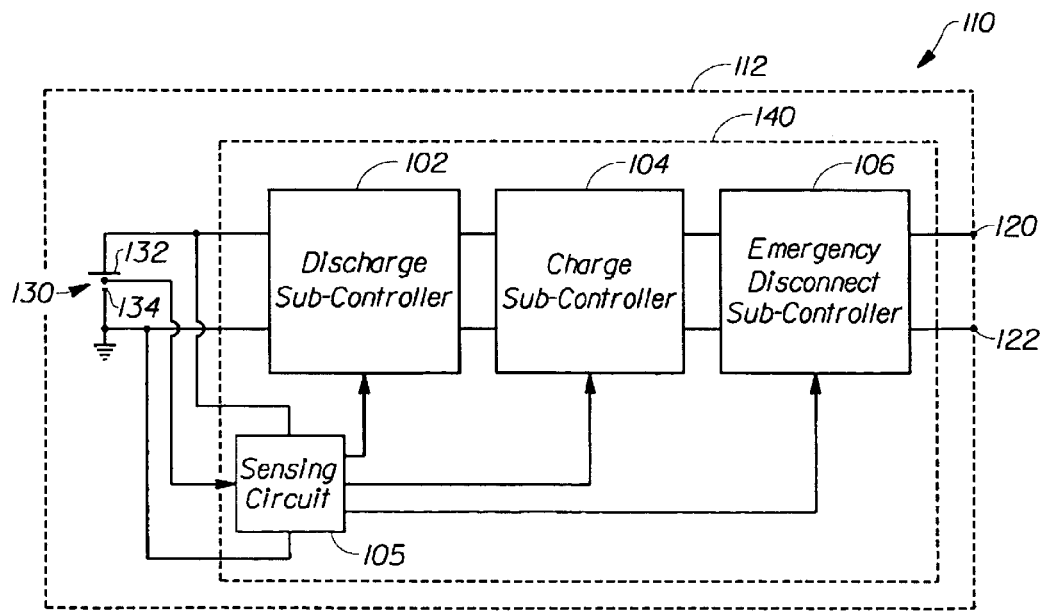
FIG. 4C is a block diagram of yet another preferred embodiment of the battery shown in FIG. 4.

FIG. 4C shows yet another embodiment of a battery 110 of the present invention having an integrated controller circuit 140 wherein the controller circuit 140 includes four main components: a discharge sub-controller circuit 102, a charge sub-controller circuit 104, an emergency sub-controller circuit 106, and a sensing circuit 105 that provides voltage control signals to the discharge sub-controller circuit 102 and/or the charge sub-controller circuit 104 based upon continuously or intermittently sensed operating parameters and/or physical conditions. The sensing circuit 105 may measure operating parameters of the electrochemical cell 130 such as the cell voltage, current drawn from the cell, phase shift between the cell voltage and current, etc. Additionally, the sensing circuit 105 may measure operating parameters of the integrated controller circuit 140 such as the output voltage and current levels, charging voltage and current levels, etc. Further, the sensing circuit may also measure physical conditions of the electrochemical cell such as the temperature, pressure, pH, the hydrogen and/or the oxygen concentration, etc. The sensing circuit 105 may measure any combination of these sufficient to effectively monitor the electrochemical cell during a charge or discharge cycle as is known in the art or described below.

The integrated controller circuit 140 of a battery 110 of the present invention, however, need not perform each of the functions listed above. The controller circuit 140, for example, may have only two or three of the components listed above such as a discharge sub-controller circuit 102 and a sensing circuit 105, a charge sub-controller circuit 104 and a sensing circuit 105, an emergency sub-controller circuit 106 and a sensing circuit 105, or any combination of these. Alternatively, the controller circuit 140 may not have a sensing circuit 105 if the discharge sub-controller circuit 102, the charge sub-controller circuit 104, and/or the emergency sub-controller circuit 106 that are included in a specific embodiment of the controller circuit 140 contain their own internal sensing circuitry necessary to perform their respective function(s). In addition, either the discharge sub-controller circuit 102, the charge sub-controller circuit 104, or both may perform the function of the emergency sub-controller 106 as well. The controller circuit 140 may also have one or more of the sub-controllers or the sensing circuit listed above along with other sub-controllers that perform functions in addition to the those functions listed above.

The discharge sub-controller circuit 102 controls the discharge of the electrochemical cell(s) 130 of the battery 110 in order to provide a longer service run time of the battery by providing a safe deep discharge to use more of a primary battery's stored energy or by optimally using the stored energy of a rechargeable battery before recharging. The charge sub-controller circuit 104 safely and efficiently controls the charging of the electrochemical cell(s) 130 of the battery 110 in which the controller circuit 140 is integrated. The emergency sub-controller 106 disconnects the electrochemical cell(s) from the battery terminals when the sensing circuit 105 detects an unsafe condition such as a short circuit, an inverse polarity, an overcharge condition, or an over discharge condition. The emergency sub-controller 106 also provides electrical connection to by pass discharge controller if load requires high safe current that, however, exceeds controller deliverable current rate.

In a preferred embodiment of a primary battery of the present invention, however, the controller 140 would preferably include the discharge sub-controller circuit 102, the emergency sub-controller 106 and the sensing circuit 105. The sensing circuit 105 preferably continuously monitors the operating parameters and the physical conditions of the electrochemical cell 130. The discharge sub-controller circuit 102 preferably provides a safer, deeper discharge of primary electrochemical cell(s) 130 of the battery 110 in order to provide a longer service run time before the battery is thrown away. The emergency sub-controller circuit 106 preferably disconnects the electrochemical cell(s) from the battery terminals 120, 122 when the sensing circuit detects an unsafe condition or provides bypass connection if load required current rate exceeds controller capability but is within safe cell discharge current range.

In a preferred embodiment of a rechargeable battery 110 of the present invention, the controller circuit 140 may additionally include a charge sub-controller circuit 104. The charge sub-controller circuit 104 safely and efficiently controls the charging of the electrochemical cell(s) 130 of the battery 110 in which the controller circuit 140 is integrated. The sensing circuit 105 preferably continuously and directly monitors the operating parameters of the controller circuit 140 and the physical conditions in the electrochemical cell(s) 130. For example, the sensing circuit 105 may monitor the cell voltage, the charging current, the internal impedance of the electrochemical cell(s), hydrogen or oxygen concentration, pH, temperature, pressure, or any other operating parameter or physical condition known in the art.

In a particularly preferred embodiment, each electrochemical cell has its own integrated controller circuit 140 that monitors the conditions in that particular cell. By directly monitoring the conditions of each particular cell, the charge sub-controller 105 can provide better safety and efficiency than a known charging controller that monitors a battery having multiple electrochemical cells. The charge sub-controller 105 minimizes losses by utilizing the instantaneous charge value of the cell(s) and the maximum capacity of the cell to continuously optimize the charging conditions.

Each controller may include one or more of the following sub-controllers: (1) a discharge sub-controller 102, (2) a charge sub-controller 104 and/or (3) an emergency sub-controller 106. For ease of discussion, the controller functions are described in terms of sub-controllers. Actual realization of the controller 140 of the present invention, however, does not require independent circuit implementations for each function because multiple functions that are performed by the controller may be, and preferably are, combined into a single circuit. For example, each sub-controller may have its own internal sensing circuits for measuring one or more operating parameters of the controller and/or physical conditions of the electrochemical cell(s), or an independent sensing circuit may measure the parameters and/or conditions and provide them and/or control signals related to the parameters and/or conditions to one or more of the sub-controllers. Further, a controller may have additional or alternative sub-controllers that perform other functions in addition to one or more of the functions listed here.

Discharge Sub-Controller

The discharge sub-controller 102 may extend the service run time of a primary or rechargeable battery of the present invention in one of several ways. First, in the case of a multiple-cell battery that contains at least one primary electrochemical cell, or at least one rechargeable cell that is preferably completely discharged before being charged (e.g., a NiCd cell is preferably discharged up to about 100%, but no more), the sub-controller may allow one or more of the electrochemical cell(s) of the battery to be more deeply discharged by an electronic device than would be otherwise possible. For example, the discharge sub-controller may allow a single-cell battery to discharge beyond the point where the cell voltage has dropped below the cut-off voltage of the device. In the case of a primary battery, the service run time of the battery may be increased by discharging the electrochemical cell(s) as deeply as possible before throwing the battery away. In a rechargeable battery, however, the battery service run time is increased by discharging the electrochemical cells to the optimal discharge depth. Thus, if the optimal discharge depth of a rechargeable electrochemical cell is below the cut-off voltage of the device which the rechargeable battery is powering, the service run time of the rechargeable battery may be increased if the rechargeable cell is allowed to discharge beyond the cut-off voltage of that device.

In this application, the term "deep discharge" refers to allowing the electrochemical cell(s) to be discharged to at least 80% of the rated capacity of the electrochemical cell(s). In addition, the term "substantial discharge" in this application refers to allowing the electrochemical cell(s) to be discharged to at least 70% of the rated capacity of the electrochemical cell(s). "Over-discharge" is referred to in this application as discharging the electrochemical cell beyond 100%, which may lead to a voltage reversal. A typical alkaline battery on the market today, for example, is generally capable of delivering approximately 40 to 70% of its stored energy capacity before the voltage level of the electrochemical cell drops to a voltage level that is insufficient to drive a given electronic device. Thus, a sub-controller of the present invention preferably provides an alkaline cell that is capable of greater than about 70% discharge before the battery cuts off. More preferably, the sub-controller provides a discharge level of greater than about 80%. Even more preferably, the sub-controller provides a discharge level of greater than about 90%, with greater than about 95% being the most preferred.

The discharge sub-controller 102 may include a converter that converts the cell voltage to a desired output voltage of a primary or rechargeable battery. In a primary battery, this allows a deeper discharge of the electrochemical cell(s) and thereby extends the service run time of the battery. In a rechargeable battery, however, the converter allows the controller to discharge the rechargeable battery to the optimal discharge depth independent of the cut-off voltage of a given device. In one embodiment of the present invention, the sub-controller may continuously convert the cell voltage to a desired output voltage over the run time of the battery. When the cell voltage drops to the level of the device cut-off voltage where the battery discharge would normally cut-off, the converter is boosting, or stepping up, the cell voltage to a level at the output of the battery that is sufficient to continue to drive the device until the voltage level drops below the minimum required voltage to drive the sub-controller or to an optimal discharge depth for a rechargeable electrochemical cell. Thus, a battery having a sub-controller design that is capable of operating at a lower voltage level than the sub-controller of another battery will provide a battery capable of being more deeply discharged independent of the cell voltage level.

In the case of a hybrid cell, the discharge sub-controller may include a low voltage converter that converts the voltage of voltaic cells to a desired output voltage of a primary or rechargeable battery. The discharge sub-controller 102 may continuously convert the voltaic cell voltage to a desired output voltage over the run time of the primary or secondary battery. Thus, a hybrid battery having a sub-controller design that is capable of operating at a lower voltage level than the sub-controller of another battery will provide a battery capable of being compatible with typical low voltage generated by many voltaic cells, such as photo, fuel, thermal, and mechanical cells. Voltaic cells discharge sub-controller 102 may provide additional energy if the hybrid battery contains a primary cell. Discharge sub-controller may also use voltaic cells to charge secondary cells or provide additional energy.

In preferred embodiments of the present invention, the converter operates only when the cell voltage falls to or below a predetermined voltage level. In such embodiments, the internal losses of the converter are minimized because the converter operates only when necessary. The predetermined voltage level is preferably in the range from the nominal voltage of the electrochemical cell to the highest cut-off voltage of the class of devices for which the battery is intended to operate. More preferably, the predetermined voltage level is slightly greater than the highest cut-off voltage of the class of devices for which the battery is intended to operate. For example, the predetermined voltage level may be in the range from about the highest cut-off voltage of the class of devices for which the battery is intended to operate to about 0.2 volts plus that cut-off voltage, preferably in the range from about the highest cut-off voltage of the class of devices for which the battery is intended to operate to about 0.15 volts plus that cut-off voltage, more preferably in the range from about the highest cut-off voltage of the class of devices for which the battery is intended to operate to about 0.1 volts plus that cut-off voltage, and even more preferably in the range from about the highest cut-off voltage of the class of devices for which the battery is intended to operate to about 0.05 volts plus that cut-off voltage. For example, an electrochemical cell having a nominal voltage of about 1.5 volts generally has a predetermined voltage is in the range between about 0.8 volts and about 1.8 volts. Preferably, the predetermined voltage is in the range between about 0.9 volts and about 1.6 volts. More preferably, the predetermined voltage is in the range between about 0.9 volts and about 1.5 volts. Even more preferably, the predetermined voltage is in the range between about 0.9 volts and about 1.2 volts, with the range between about 1.0 volts and about 1.2 volts being yet even more preferred. The voltage level of slightly greater than or equal to the highest cut-off voltage of the class of devices for which the battery is intended to operate being the most preferred. A sub-controller designed for operation with an electrochemical cell having a nominal voltage of about 3.0 volts, however, generally may have a predetermined voltage level is in the range from about 2.0 volts to about 3.4 volts. Preferably, the predetermined voltage is in the range from about 2.2 volts to about 3.2 volts. More preferably, the predetermined voltage is in the range from about 2.4 volts to about 3.2 volts. Even more preferably, the predetermined voltage is in the range from about 2.6 volts to about 3.2 volts, with the range from about 2.8 volts to about 3.0 volts being yet even more preferred. The voltage level of slightly greater than or equal to the highest cut-off voltage of the class of devices for which the battery is intended to operate being the most preferred.

When the cell voltage falls to or below the predetermined voltage level, the discharge sub-controller turns the converter on and boosts the cell voltage to a desired output voltage sufficient to drive the load. This eliminates losses of the converter that are not necessary when the cell voltage is high enough to drive the load, but then allows the electrochemical cell to continue to discharge even after the cell voltage drops below the level required to drive the load until the cell voltage reaches the minimum operating voltage of the converter in the case of a primary cell or, in the case of a rechargeable cell, until the cell voltage of the cell reaches the optimal discharge depth. The sub-controller may use any one or more of a number of control mechanisms from a simple voltage comparator and electronic switch combination that turns on the converter when the cell voltage drops to the predetermined voltage level, to more complex control schemes such as the ones described below.

A universal battery of the present invention that is designed for a given output voltage is preferably able to extend the service run time of the battery when it is used to power a device. As used in this application, a "universal" battery is a battery that can provide a uniform or standard output voltage independent of the cell electrochemistry or voltaic cell physical mechanism. Thus, the battery of the present invention is preferably designed to extend its service run time by maintaining the output voltage of the battery at a level greater than or equal to the cut-off voltage of a given device until the built-in sub-controller shuts down when the voltage of the primary electrochemical cell(s) drops to a level below which the sub-controller can no longer operate, or when a rechargeable electrochemical cell drops to its optimal discharge depth. A battery of the present invention that is designed to power a specific electronic device or a narrow class or electronic devices that have similar cut-off voltages may be specifically designed to operate more efficiently by matching the predetermined voltage level to the cut-off voltage(s) of those device(s) more closely.

Second, the discharge sub-controller 102 may also be used to extend the service run time of a rechargeable electrochemical cell by optimally discharging the cell in order to increase the number or the efficiency of charge cycles. In a sealed lead-acid cell, for example, a deep discharge may damage the cell and/or reduce the number or the efficiency of future recharge cycles. The sub-controller may, for example, control the discharge of a particular type of rechargeable electrochemical cell so that the discharge cycle is ended when the cell voltage reaches a predetermined voltage level that is the optimal discharge depth for that type of or that particular electrochemical cell. In a lead-acid rechargeable electrochemical cell, for example, the predetermined voltage level is in the range from about 0.7 volts to about 1.6 volts, with about 0.7 volts being more preferred. In a lithium $MnO_2$ rechargeable electrochemical cell, for example, the predetermined voltage level is in the range from about 2.0 volts to about 3.0 volts, with about 2.4 volts being the most preferred. Alternatively, the discharge sub-controller may also end the discharge cycle when the internal impedance of the rechargeable electrochemical cell reaches a predetermined impedance level that corresponds to the maximum desired discharge depth for that type of or that particular electrochemical cell. Thus, in a battery of the present invention that contains at least one rechargeable electrochemical cell that is preferably not deeply discharged beyond an optimal discharge depth, a discharge sub-controller may be used to increase the service run time of the battery by ending the discharge cycle when the cell voltage reaches a predetermined voltage level or when the cell internal impedance reaches a predetermined internal impedance level or as indicated by any appropriate built-in chemical sensor.

Third, the discharge sub-controller may also step down the cell voltage of electrochemical cell(s) having a nominal voltage greater than the desired output voltage and/or alter the output impedance of the electrochemical cell(s) of a battery. This not only extends the run time of the batteries, but also allows for greater interchangeability between electrochemical cells having different nominal voltages than is otherwise possible, allows designers to take advantage of the greater storage potential of electrochemical cells having a higher nominal voltage, and allows designers to alter the output impedance of a certain electrochemical cell in order to match the impedance to a desired level either to increase the interchangeability of the electrochemical cell with other types of electrochemical cells, and/or to increase the efficiency of the electrochemical cell with a particular type of load. In addition, electrochemical cells that are inefficient, hazardous to the environment, expensive, etc. and are used generally only because a particular nominal voltage is required, such as a mercury cadmium cell, may be replaced by safer, more efficient or cheaper electrochemical cells having their nominal voltage stepped up or stepped down or their output impedance altered in order to meet the required nominal voltage or output impedance required by the application.

For example, an electrochemical cell having a nominal voltage of about 1.8 volts or higher can be packaged with a sub-controller that steps down this higher nominal voltage to the standard nominal level of about 1.5 volts so that the battery may be used interchangeably with a battery having a nominal voltage of about 1.5 volts. In one specific example, a standard lithium cell such as a primary lithium MnO2 cell having a nominal voltage of approximately 3.0 volts may be packaged in a battery with a step down sub-controller so that the battery has an output voltage of approximately 1.5 volts. This provides a battery having at least two times more capacity than a battery having an electrochemical cell with a nominal voltage of about 1.5 volts and the same volume. In addition, it also provides a high voltage lithium cell that is truly interchangeable with a standard alkaline or zinc-carbon single-cell battery, without the need to chemically reduce the lithium high potential. Further, a rechargeable lithium ion cell has a nominal voltage of about 4.0 volts. The cell may be packaged in a battery with a step-down controller so that the single-cell battery has an output voltage of about 1.4 volts. The lithium ion battery of the present invention may be interchangeable with a standard single-cell NiCd or NiMH rechargeable battery, but would be able to provide about two to three times the capacity of a single-cell NiCd or NiMH battery having the same volume.

Additionally, batteries having electrochemical cells such as a lithium ion, magnesium, magnesium air and aluminum air also have nominal voltages above about 1.8 volts and can be used interchangeably with a standard battery having a nominal voltage of about 1.5 volts. Not only can different types of electrochemical cells be used interchangeably, but different types of electrochemical cells can be packaged together in a hybrid battery. Thus, different types of batteries having different electrochemical cells with various nominal voltages or internal impedance may be used interchangeably, or hybrid batteries may be manufactured having different types of electrochemical cells and voltaic cells such as photo, thermal, fuel, mechanical, etc.

Alternatively, electrochemical cells that have nominal voltages below that which a typical electronic device will operate may be used with a discharge sub-controller 102 having a built-in step-up converter to boost the nominal voltage. This allows a battery having this type of electrochemical cell to be used with a device that requires a higher voltage level than the cell would otherwise provide. In addition, the battery having this type of cell may also be used interchangeably with a standard alkaline or a zinc-carbon electrochemical cell. This may provide commercially-feasible, usable batteries having electrochemical cells that have not otherwise been considered for consumer use because the nominal voltages were too low to be practical.

Additionally, several voltaic cells that have nominal voltages below that which a typical electronic device will operate may be used with a discharge sub-controller having a built-in step-up converter to boost the nominal voltage. This allows a hybrid battery having this type of voltaic cell to be used with a device that requires a higher voltage level than the cell would otherwise provide. In addition, the battery having this type of cell may also be used interchangeably with a standard alkaline or a zinc-carbon electrochemical cell. This may provide commercially-feasible, usable batteries having hybrid cells that have not otherwise been considered for consumer use because the nominal voltages were too low to be practical.

Table 1 is not meant to be exclusive, but rather lists exemplary primary, secondary and reserve electrochemical cells that may be used in a battery of the present invention. For example, different types of primary and/or rechargeable electrochemical cells that have different nominal voltages or internal impedance may be used with a converter to create a universal single-cell battery that has the same output voltage as a standard 1.5 volt alkaline primary or rechargeable battery or a standard 1.4 volt NiCd rechargeable battery. In addition, the primary, secondary and/or reserve cells may be used together in a hybrid multiple-cell battery of the present invention. Indeed, the present invention allows greater interchangeability between various types of electrochemical cells, and between electrochemical cells and alternative power supplies such as fuel cells, capacitors, etc. than ever before. By placing a controller in each electrochemical cell, the electrical characteristics such as the nominal voltage and the output impedance of different types of electrochemical cells can be adjusted in order to allow a larger variety of cells to be used in making interchangeable batteries. Batteries may be specially designed to take advantage of particular advantages of an electrochemical cell, while still permitting interchangeability with batteries that contain other types of cells. Further, the present invention may be used to create new standard voltage levels by converting the nominal voltages of electrochemical cells to the voltage levels of the standards.

The same is true for physical mechanisms other than chemical used for generating electric energy. Typical single photo, thermal, fuel, and mechanical (e.g., PST) cell have their output voltage far below standard device or other electrochemical cell voltage. The present invention allows to combine low voltage voltaic and standard electrochemical system in a single hybrid cell or independent cells to power devices requiring voltage equal or different than hybrid cell or independent cells.

TABLE 1

Electrochemical Cell Types and Nominal Voltages

| Type of Cell | Nominal Voltage | Type of Cell | Nominal Voltage |
|---|---|---|---|
| Primary Cells | | | |
| Mercad | 0.9 volts | Lithium FeS2 | 1.6 volts |
| Mercuric Oxide | 1.35 volts | Magnesium-Organic electrolyte | 1.6 volts |
| Mercuric Oxide with MnO2 | 1.4 volts | Magnesium MnO2 | 2.8 volts |
| Zinc-Air | 1.4 volts | Lithium-Solid Electrolyte | 2.8 volts |
| Carbon-Zinc | 1.5 volts | Lithium MnO2 | 3.0 volts |

TABLE 1-continued

Electrochemical Cell Types and Nominal Voltages

| Type of Cell | Nominal Voltage | Type of Cell | Nominal Voltage |
|---|---|---|---|
| Zinc-Chloride | 1.5 volts | Lithium (CF)n | 3.0 volts |
| Alkaline MnO2 | 1.5 volts | Lithium SO2 | 3.0 volts |
| Silver-Oxide | 1.5 volts | Lithium SOCl2 | 3.6 volts |
| | | Secondary Cells | |
| Silver-cadmium | 1.1 volts | Zinc-bromine | 1.6 volts |
| Edison (Fe—Ni oxide) | 1.2 volts | High Temperature Li(Al)—FeS2 | 1.7 volts |
| Nickel-cadmium | 1.2 volts | Aluminum-air | 1.9 volts |
| Nickel Metal Hydride | 1.2 volts | Lead-acid | 2.0 volts |
| Nickel Hydrogen | 1.2 volts | High Temperature Na—S | 2.0 volts |
| Silver-zinc | 1.5 volts | Lithium-polymer Li- V6O13 | 3.0 volts |
| Zinc-air | 1.5 volts | Lithium-ion C- LixCoO2 | 4.0 volts |
| Nickel-zinc | 1.6 volts | | |
| | | Reserve Cells | |
| Cuprous Chloride | 1.3 volts | Thermal Li—FeS2 | 2.0 volts |
| Zinc/silver oxide | 1.5 volts | | |

In addition, otherwise incompatible electrochemical cells may be used together in hybrid batteries specially designed for particular types of applications. For example, a zinc-air electrochemical cell may be used together either in parallel or in series with a lithium cell in a hybrid battery. The zinc-air cell has a nominal voltage of about 1.5 volts and a very high energy density, but can only provide low, steady current levels. The lithium cell, however, has a nominal voltage level of about 3.0 volts and can provide short bursts of high current levels. The discharge sub-controllers of each electrochemical cell provide the same nominal output voltage and allow for an arrangement either in a parallel or series electrical configuration. When the cells are in a parallel configuration, the sub-controllers also prevent the cells from charging one another. The sub-controller for each cell can be used to connect or disconnect either or both of the cells as needed by the load. Thus, when the load is in a low power mode, the zinc-air cell can be connected to provide a steady, low current, and, when the load is in a high power mode, the lithium cell or the lithium and the zinc-air cells in combination can provide the current necessary to power the load.

Hybrid batteries may also contain many different combinations of electrochemical cells such as primary and secondary cells, primary and reserve cells, secondary and reserve cells, or primary, secondary and reserve cells. Further, a hybrid battery may also contain a combination of one or more electrochemical cells and one or more additional power supplies such as a photo, thermal, fuel or mechanical cell, a conventional capacitor or even a super/ultra-capacitor. For example, a hybrid battery may contain combinations such as alkaline and metal-air cells, metal-air and a secondary cells, a metal-air cell and a super capacitor. Moreover, hybrid batteries may also contain any combination of two or more of the above-mentioned cells or power supplies.

Further, the discharge sub-controller may also extend the service run time of a battery by protecting the electrochemical cell(s) from current peaks that can impair the operation of the electrochemical cell components and lower the cell voltage. For example, the sub-controller may prevent high current demands from creating a memory effect in the cell and decreasing the run time of the electrochemical cell(s). The current peaks are also harmful to electrochemical cells such as alkaline, lithium, NiCd, SLA, metal hydride and zinc-air cells.

The discharge sub-controller may protect the electrochemical cell from current peaks by providing a temporary storage of electrical charge at the output of the sub-controller so that the temporary storage may be utilized upon immediate demand. Therefore, a current peak demand may be completely eliminated or significantly reduced before it reaches the electrochemical cell. This both allows a battery to provide current peaks higher than the electrochemical cell(s) can provide directly and protects the electrochemical cell(s) from current peaks that may be detrimental to the cell components. The temporary storage element is preferably a capacitor. This capacitor may be any type of capacitor that is known in the art such as a conventional capacitor, a thick-film printed capacitor or even a "super/ultra-capacitor." FIG. 13, for example, shows capacitor Cf connected across the output terminals 1320 and 1322 of the container 1312.

A single discharge sub-controller will preferably extend the service run time of the battery by both protecting the cell against current peaks and by converting the cell voltage to a desired output voltage. For example, a preferred embodiment of the sub-controller can turn a converter on when the cell voltage drops to a predetermined voltage in order to minimize losses associated with the converter. The same sub-controller can monitor both the cell voltage and the output load current and turn on the converter if either the cell voltage reaches the predetermined voltage level or the load current reaches a predetermined current level. Alternatively, the sub-controller may monitor both the cell voltage and the output load current and determine if supplying the required load current will drop the cell voltage below a cut-off voltage level. In the latter example, the sub-controller is operating upon two input signals combined in an algorithm to determine if the converter should be turned on. In the former example, however, the sub-controller turns on the converter if either the cell voltage drops to a predetermined voltage level, or the output load current rises to a predetermined current level. These, along with other possible control schemes, are discussed in more detail below.

The present invention relates to specialized batteries as well as standard consumer batteries, such as AAAA, AAA, AA, C, or D cells, and 9 volt batteries. The invention contemplates the use of specialized primary batteries, and hybrid batteries that could be used in various applications. It is anticipated that these specialized batteries and hybrid batteries could be used to replace rechargeable batteries for uses such as for cellular telephones, laptop computers, etc., which are currently limited by the ability of primary batteries to provide the required current rate over a sufficient period of time. In addition, being able to individually control the output voltage and output impedance of the cells will allow battery designers to design entirely new types of hybrid batteries that use different types of cells in combination or alternative power supplies, such as photo, thermal, fuel, or mechanical cells, conventional capacitors or even "super/ultra-capacitors," in the same hybrid battery.

The increase of interchangeable types of electrochemical cells could also allow battery designers to provide standard primary or rechargeable batteries to decrease the reliance upon batteries custom designed for particular devices such as cellular telephones, laptop computers, camcorders, cameras, etc. A consumer could simply purchase standard batteries to power a cellular telephone, much like a consumer would presently purchase for a flashlight or tape recorder, instead of having to purchase a battery specifically manufactured for the particular type, brand and/or model electronic device. In addition, as the number of standard batteries manufactured increased, the cost per unit would rapidly decrease, resulting in much more affordable batteries that could ultimately replace specially designed rechargeable batteries. Further, primary and rechargeable batteries could also be used interchangeably with each other. For example, if the rechargeable batteries of a laptop computer were exhausted, the user could purchase primary batteries that would last for several hours of use until the user could charge the rechargeable batteries. The user could also purchase less expensive batteries if the user did not need certain higher-performance levels that could be provided by the device with more expensive batteries.

Electronic labeling technology such as that used on photographic film, etc. could also be used to designate the exact type of cell(s) in the battery, rated and/or remaining capacity of the cell(s), peak and optimal current delivery capabilities, current charge level, internal impedance, etc. so that a "smart" device could read the electronic labeling and optimize its consumption to enhance the performance of the device, to extend the service run time of the battery, etc. A camera, which already utilizes electronic labeling to determine film speed, for example, could also utilize electronic labeling technology with its batteries to allow for a slower charge time of the flash, stop use of the flash, etc. in order to optimize the service run time of a particular battery. A laptop could also utilize electronic labeling technology to determine the most efficient operating parameters for particular batteries by, for example, changing its operating speed in order to best use the remaining charge in the battery for a duration desired by a user, or utilizing power on/power off technology to conserve energy of the battery. In addition, camcorders, cellular telephones, etc. could also utilize electronic labeling to optimize the usage of batteries.

The present invention also relates to standard consumer batteries such as AAA, AA, C or D cells, and 9 volt batteries. In addition to primary batteries being interchangeable with different types of primary or even rechargeable batteries, standard primary or rechargeable batteries may be available for applications in which only custom-designed batteries are presently available. Depending on their needs, for example, consumers could purchase one or more standard primary or rechargeable batteries that they could put directly into their laptop computers, camcorders, cellular telephones, and other portable electronic equipment. As mentioned above, as the number of standard batteries manufactured increased, the cost per unit would rapidly decrease, resulting in much more affordable batteries that could ultimately replace specially designed rechargeable batteries.

In order to increase the service run time of primary batteries or rechargeable batteries that have a relatively low optimal discharge depth, the discharge sub-controller can be designed to operate at even lower voltages as circuit manufacturing technology advances. A discharge sub-controller, for example can be designed to operate at voltage levels as low as about 0.1 volts in a silicon carbide ("SiC") embodiment, about 0.34 volts in a gallium arsenide ("GaAs") embodiment, and about 0.54 volts in a conventional silicon-based embodiment. In addition, as printing size decreases, these minimum operating voltages will decrease as well. In silicon, for example, decreasing the circuit printing to 0.18 micron technology would decrease the minimum operating voltage from about 0.54 to about 0.4 volts. As described above, the lower the minimum required operating voltage of the discharge sub-controller, the lower that the discharge sub-controller can regulate the cell voltage in order to provide the deepest discharge of a primary electrochemical cell or to optimally discharge a rechargeable electrochemical cell down to a low optimal discharge depth. Thus, it is within the comprehension of this invention to utilize different advances of in circuit fabrication to increase the battery utilization up to approximately 100% of the stored charge of the electrochemical cell. The present silicon-based embodiment, however, provides up to a 95% usage of the battery storage potential, which is quite high in comparison to the average 40–70% usage of primary electrochemical cells without a controller.

In one silicon-based preferred embodiment, for example, the discharge sub-controller 102 is designed to operate at voltages as low as about 1 volt, more preferably about 0.85 volts, even more preferably about 0.8 volts, yet even more preferably about 0.75 volts, even more preferably about 0.7 volts, yet even more preferably about 0.65 volts, even more preferably about 0.6 volts, with about 0.54 volts being the most preferred. In a sub-controller designed for an electrochemical cell having a nominal voltage of about 1.5 volts, the sub-controller is preferably capable of operating at an input voltage at least as high as about 1.6 volts. More preferably, the discharge sub-controller is capable of operating at an input voltage of at least as high as about 1.8 volts. Thus, a preferred sub-controller should be able to operate in a voltage range from a minimum of about 0.8 volts to at least 1.6 volts. The sub-controller may, and preferably does, however, operate outside of that range as well.

In a preferred embodiment of a discharge sub-controller 102 of the present invention designed for use with an electrochemical cell 30 such as a primary lithium MnO2 cell having a nominal voltage of about 3.0 volts, however, the sub-controller must be able to operate at a higher voltage level than is required for a discharge sub-controller used in conjunction with an electrochemical cell having a nominal voltage of about 1.5 volts. In the case of an electrochemical cell having a nominal voltage of about 3.0 volts, the discharge sub-controller is preferably able to operate in the range from about 2.4 volts to about 3.2 volts. The sub-controller more preferably is capable of operating in a voltage range from about 0.8 volts to at least about 3.2 volts. More preferably, the sub-controller is capable of operating with an input voltage in the range from about 0.6 volts to at least about 3.4 volts. Even more preferably, the sub-controller is capable of operating with an input voltage in the range from about 0.54 volts to at least about 3.6 volts, with the range from about 0.45 volts to at least about 3.8 volts being the most preferred. The sub-controller may, and preferably does, however, operate outside of that range as well.

In a preferred embodiment of a discharge sub-controller 102 of the present invention designed for use with an electrochemical cell 30 such as a rechargeable lithium ion cell having a nominal voltage of about 4.0 volts, however, the sub-controller must be able to operate at an even higher voltage level than is required for a discharge sub-controller used in conjunction with an electrochemical cell having a nominal voltage of about 3.0 or about 1.5 volts. In the case of an electrochemical cell having a nominal voltage of about 4.0 volts, the discharge sub-controller is preferably able to operate in the range from about 2.0 volts to about 4.0 volts. The sub-controller more preferably is capable of operating in a voltage range from about 0.8 volts to at least about 4.0 volts. More preferably, the sub-controller is capable of operating with an input voltage in the range from about 0.6 volts to at least about 4.0 volts. Even more preferably, the sub-controller is capable of operating with an input voltage in the range from about 0.54 volts to at least about 4.0 volts, with the range from about 0.45 volts to at least about 4.0 volts being the most preferred. The sub-controller may, and preferably does, however, operate outside of that range as well.

An alternative preferred embodiment is capable of operation with an electrochemical cell having a nominal voltage of either about 1.5 volts or about 3.0 volts. In this embodiment the discharge sub-controller is capable of operating with a minimum input voltage of about 0.8 volts, preferably about 0.7 volts, more preferably about 0.6 volts and most preferably about 0.54 volts, and a maximum input voltage of at least about 3.2 volts, preferably about 3.4 volts, more preferably about 3.6 volts and most preferably about 3.8 volts. For example, the discharge sub-controller may be capable of operating in the range from about 0.54 volts to about 3.4 volts, or from about 0.54 volts to about 3.8 volts, or from about 0.7 volts to about 3.8 volts, etc.

The batteries of the present invention also provide distinct advantages over typical batteries when used with electric devices such as flashlights, etc. that do not have a cut-off voltage. With a typical battery, as the battery is discharged, the output voltage of the battery decreases. Because the output power of the electric device is directly proportional to the voltage supplied by the battery, the output of the electric device decreases proportionately with the battery output voltage. For example, the intensity of a flashlight light bulb will continue to dim as the output voltage of the battery decreases until the battery is fully discharged. The battery of the present invention, however, has a discharge sub-controller that regulates the cell voltage into a relatively constant, controlled voltage level over the entire discharge cycle of the battery until the electrochemical cell 30 voltage decreases to a level below which the sub-controller is capable of operating. At that time, the battery will shut down, and the electric device will stop operating. During the discharge cycle, however, the electric device will continue to provide a relatively steady output (e.g., bulb intensity) and full functionality until the battery shuts down.

A preferred embodiment of a battery of the present invention also includes a low remaining charge warning to the user as well as remaining capacity indicator. The discharge sub-controller, for example, may disconnect and reconnect the electrochemical cell(s) from the output terminals of the battery intermittently for a short duration of time when the electrochemical cell voltage reaches a predetermined value. This may provide a visible, audible, vibrational, or device readable indication that the battery capacity is running down. Additionally, the sub-controller could also artificially recreate conditions of an accelerated battery discharge condition by decreasing the output voltage of the battery at the end of the life of the battery. For example, the sub-controller could begin ramping down the output voltage when the battery storage capacity is at about 5% of its rated capacity. This could provide an indication to the user such as a decreasing volume in a tape or compact disc player, or provide an indication to the device, which could warn the user accordingly.

Figure 7:
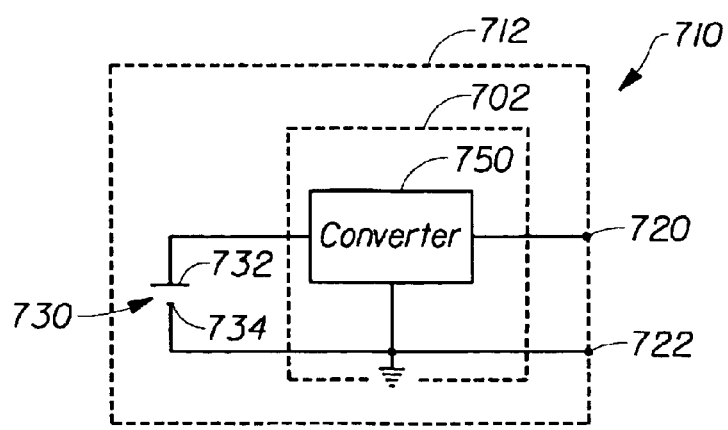
FIG. 7 is a block diagram of another preferred embodiment of a battery of the present invention.

FIG. 7 shows a block diagram of one embodiment of the present invention in which the DC/DC converter 750 of the discharge sub-controller 702 is electrically, or preferably electronically, connected between the positive 732 and negative 734 electrodes of the electrochemical cell 730 and the positive 720 and negative 722 terminals of the container 712. The DC/DC converter 750 converts the cell voltage across the positive 732 and the negative 734 electrodes of the electrochemical cell 730 to the output voltage at the positive 720 and the negative 722 terminals of the container 712. The DC/DC converter 750 may provide for step up conversion, step down conversion, both step up and step down conversion, or voltage stabilization at the output terminals 720 and 722. In this embodiment, the DC/DC converter 750 operates in a continuous mode in which the output voltage of the electrochemical cell 730 will be converted into a stable output voltage at the terminals 720 and 722 of the container over the run time of the battery. This embodiment stabilizes the output voltage of the container 712 at the output terminals 720 and 722. Providing a stable output voltage allows electronic device designers to decrease complexity of the power management circuits of the electronic devices, and, correspondingly, to decrease the size, weight and cost of the devices as well.

The DC/DC converter 750 will continue to operate until the cell voltage of the electrochemical cell 730 drops below either the optimal discharge depth of the electrochemical cell in the case of a rechargeable electrochemical cell or the minimum forward-bias voltage of the electronic components, Vfb, of the converter 750 in the case of a primary electrochemical cell. To the extent that the optimal discharge depth of the electrochemical cell or the minimum switching voltage, Vfb, of the DC/DC converter 750 is lower than the cut-off voltage of the electronic device that the battery 710 is powering, the controller 740 will also extend the service run time of the battery 710 by discharging the battery 710 beyond the cut-off voltage of the electronic device by maintaining the output voltage at the terminals 720 and 722 of the container 712 above the cut-off voltage of the electronic device.

In one preferred embodiment of the present invention as shown in FIG. 7, the DC/DC converter 750 that operates in a continuous mode may be a step down converter that lowers the cell voltage of the electrochemical cell 730 to an output voltage of the container 712. In one embodiment of a discharge sub-controller 702 that includes a step down converter, the converter lowers the voltage of a first type of electrochemical cell 730 to an output voltage of the container 712 that is about the nominal voltage level of a second type of electrochemical cell so that the battery containing the first type of electrochemical cell 730 is interchangeable with a battery containing the second type of electrochemical cell. For example, an electrochemical cell having a higher nominal voltage than a standard 1.5 volt cell could be used in combination with a step down converter that operates continuously to provide a cell that is interchangeable with the standard cell without the need to chemically alter the electrochemical cell. This embodiment allows for a greater degree of interchangeability between different types of electrochemical cells than is otherwise possible without chemically altering the structure of the electrochemical cell itself and diminishing the chemical energy storage of the cell.

A primary or rechargeable lithium cell, for example, may be used in a standard AA battery package to provide at least two times more capacity than an alkaline battery of the same volume. A lithium cell such as a primary or rechargeable lithium MnO2 has a nominal voltage of about 3.0 volts and cannot normally be used interchangeably with a standard AA alkaline battery that has about a 1.5 volt nominal voltage. A lithium ion cell having a nominal voltage of about 4.0 volts also cannot normally be used interchangeably with a standard NiCd battery that has a nominal voltage of about 1.4 volts. Battery designers have, however, created new types of lithium batteries e.g., (LiFeS$_2$) that have a nominal voltage of about 1.6 volts in order to create a lithium battery that may be used interchangeably with a standard AA alkaline battery, for example. Although this 1.6 volt lithium battery still has the capability of delivering high current levels for uses such as photographic flash loads, use of the 1.6 volt lithium electrochemical cell results in a substantial chemical reduction in the chemical energy storage per lithium weight.

The present invention, however, provides the ability to use a high voltage primary or rechargeable lithium electrochemical cell that has a nominal voltage of about 3.0 or about 4.0 volts and a controller to convert that nominal voltage down to about 1.5 volts or about 1.4 volts. Thus, the battery provides roughly twice the chemical energy storage of a 1.5 volt alkaline cell, or a 1.4 volt NiCd battery in a battery that is completely interchangeable with any of those 1.5 volt or 1.4 volt batteries. Additionally, the lithium battery of the present invention would provide the same high current levels as a 1.6 volt $LiFeS_2$ cell.

Additionally, the discharge sub-controller 702 also optimizes the performance of an electric device such as a flashlight that uses battery 710. Although an electric device will not shut off like an electronic device at a minimum operating voltage, the performance of the electric device, such as the intensity of the flashlight bulb, will decrease as the input voltage decreases. Thus, a stable battery 710 output voltage allows the electric device performance to remain constant over the run time of the battery without the device performance decreasing as the voltage of the electrochemical cell 730 decreases.

The DC/DC converter 750 may utilize one or more of many known control schemes such as pulse modulation, which can further include pulse-width modulation ("PWM"), pulse-amplitude modulation ("PAM"), pulse-frequency modulation ("PFM") and pulse-phase modulation ("PM"), pulse skip low duty control scheme, resonant converters, etc. to control the operating parameters of the converter 750. A preferred embodiment of the converter 750 of the present invention utilizes pulse-width modulation. An even more preferred embodiment utilizes a combination of pulse-width modulation and pulse-phase modulation, which is described in detail below.

In a preferred embodiment DC/DC converter 750 for use in a battery of the present invention, the converter is controlled by a pulse-width modulator to drive the DC/DC converter 750. The pulse-width modulator generates a fixed frequency control signal in which the duty cycle is varied. For example, the duty cycle may be zero when the DC/DC converter is off, 100% when the converter is operating at full capacity, and varied between zero and 100% depending upon the demand of the load and/or the remaining capacity of the electrochemical cell 730. The pulse-width modulation scheme has at least one input signal that is used to generate the duty cycle. In one embodiment, the output voltage at the terminals 720 and 722 of the container 712 is continuously sampled and compared to a reference voltage. The error correction signal is used to alter the duty cycle of the DC/DC converter. In this instance, the negative feedback loop from the output voltage at the terminals 720 and 722 of the container 712 allows the DC/DC converter 750 to provide a stabilized output voltage. Alternatively, the DC/DC converter 750 can utilize multiple input signals such as the cell voltage, i.e., the voltage across the positive 732 and the negative 734 electrodes of the electrochemical cell 730, and the output current to generate the duty cycle. In this embodiment, the cell voltage and the output current are monitored, and the DC/DC converter 750 generates a duty cycle that is a function of those two parameters.

FIGS. 8–11 show block diagrams of additional embodiments of discharge sub-controller circuits of the present invention. In each of these embodiments, the sub-controller circuit includes at least two main components: (1) a DC/DC converter; and (2) a converter controller that electrically, or preferably electronically, connects and disconnects the DC/DC converter between the electrodes of the electrochemical cell and the output terminals of the container so that the internal losses of the DC/DC converter are incurred only when the DC/DC converter is necessary to convert the cell voltage to a voltage necessary to drive the load. The DC/DC converter, for example, may be turned on only when the cell voltage falls to a predetermined level below which the load can no longer operate. Alternatively, if the electronic device requires an input voltage within a specific range such as 10% of the nominal voltage of the battery, for example, the converter controller may turn "on" the DC/DC converter when the cell voltage is outside the desired range, but turn the converter "off" when the cell voltage is within the desired range.

Figure 8:
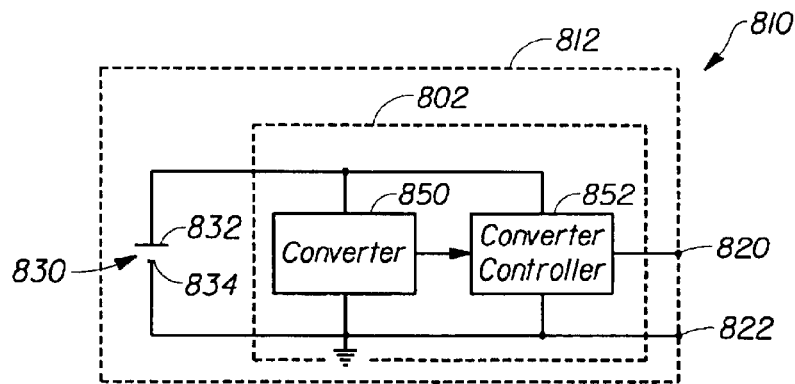
FIG. 8 is a block diagram of yet another preferred embodiment of a battery of the present invention.

In FIG. 8, for example, the DC/DC converter 850 is electrically connected between the positive 832 and the negative 834 electrodes of the electrochemical cell 830 and the positive 820 and the negative 822 terminals of the container 812. The converter controller 852 is also electrically connected between the positive 832 and negative 834 electrodes electrochemical cell 830 and the positive 820 and negative 822 terminals of the container 812. In this example, the converter controller 852 acts as a switch that either connects the electrochemical cell 830 directly to the output terminals 820 and 822 of the container 812, or connects the DC/DC converter 850 between the electrochemical cell 830 and the output terminals 820 and 822 of the container 812. The converter controller 852 continuously samples the output voltage and compares it to one or more internally generated threshold voltages. If the output voltage of the container 812 falls below the threshold voltage level or is outside a desired range of threshold voltages, for example, the converter controller 852 "turns on" the DC/DC converter 850 by electrically, or preferably electronically, connecting the DC/DC converter 850 between the electrochemical cell 830 and the output terminals 820 and 822 of the container 812. The threshold voltage is preferably in the range from about the nominal voltage of the electrochemical cell 830 to about the highest cut-off voltage of the class of electronic devices with which the battery is designed to operate. Alternatively, the converter controller 852 may continuously sample the cell voltage of the electrochemical cell 830 and compare that voltage to the threshold voltage in order to control the operation of the DC/DC converter 850.

In the case of a rechargeable battery, the converter controller 852 preferably also disconnects the electrochemical cell 830 from the output terminals 820 and 822 of the container 812 when the cell voltage reaches about the optimal discharge depth of the electrochemical cell 830. This provides a maximum cycle life of the battery in which each discharge cycle has an optimized battery run time. Thus, the service run time of the battery may be increased.

Figure 9:
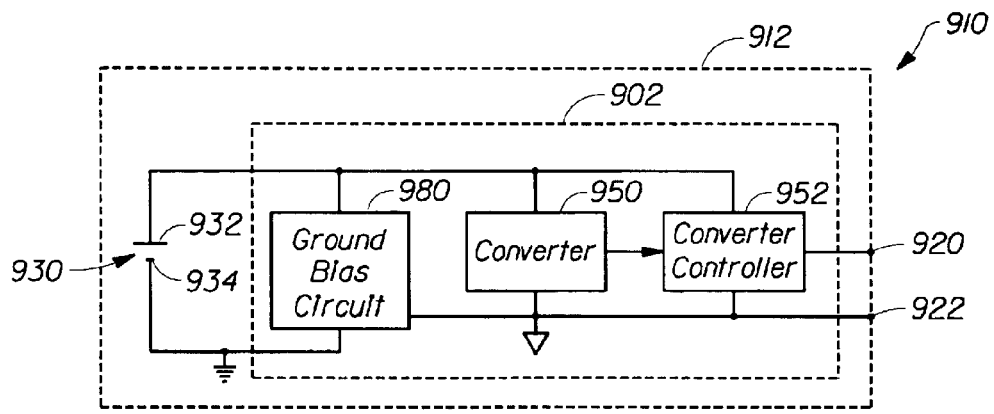
FIG. 9 is a block diagram of another preferred embodiment of a battery of the present invention.

The discharge sub-controller 902 of FIG. 9 may include the elements of the discharge sub-controller 802 shown in FIG. 8, but further includes a ground bias circuit 980 electrically connected between the electrodes 932 and 934 of the electrochemical cell 930, and the DC/DC converter 950, the converter controller 952, and the output terminals 920 and 922 of the container 912. The ground bias circuit 980 provides a negatively biased voltage level, Vnb, to the DC/DC converter 950 and to the negative output terminal 922 of the container 912. This increases the voltage applied to the DC/DC converter 950 from the cell voltage to a voltage level of the cell voltage plus the absolute value of the negatively biased voltage level, Vnb. This allows the converter 950 to operate at an efficient voltage level until the actual cell voltage drops to a voltage level below the minimum forward-bias voltage necessary to drive the ground bias circuit 980. Thus, the converter 950 may more efficiently draw a higher current level from the electrochemical cell 930 than it would be able to with only the cell voltage of the electrochemical cell 930 driving the converter 950. In a preferred embodiment of the discharge sub-controller 902 for a battery 910 of the present invention having an electrochemical cell with a nominal voltage of about 1.5 volts, the negatively biased voltage, Vnb, is preferably in the range between about 0 volts and about 1 volt. More preferably the negatively biased voltage, Vnb, is about 0.5 volts, with 0.4 volts being the most preferred. Therefore, the ground bias circuit 980 allows the converter to more deeply discharge the electrochemical cell 930 and increase the efficiency of the converter 950 in extracting the current from the electrochemical cell 930 when the cell voltage drops below about 1 volt for an electrochemical cell having a nominal voltage of about 1.5 volts.

Figure 9A:
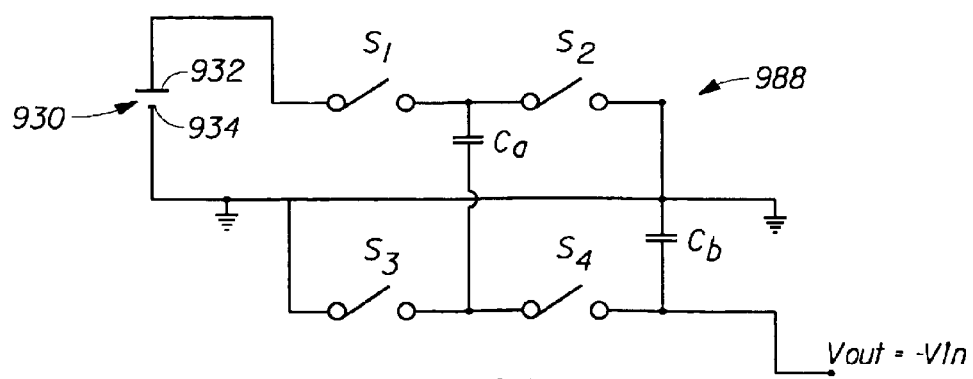
FIG. 9A is a schematic diagram of one embodiment of an aspect of the preferred embodiment of the battery of FIG. 9.

One exemplary embodiment of a charge pump 988 that may be used as a ground bias circuit 980 in a battery 910 of the present invention is shown in FIG. 9A. In this embodiment, when switches S1 and S3 are closed, and S2 and S4 are open, the cell voltage of the electrochemical cell 930 charges capacitor Ca. Then, when switches S1 and S3 are open, and S2 and S4 are closed, the charge on capacitor Ca is inverted and transferred to capacitor Cb, which provides an inverted output voltage from the cell voltage of the electrochemical cell 930. Alternatively, the charge pump 988 shown in FIG. 9A may be replaced by any suitable charge pump circuit known in the art.

Figure 9B:
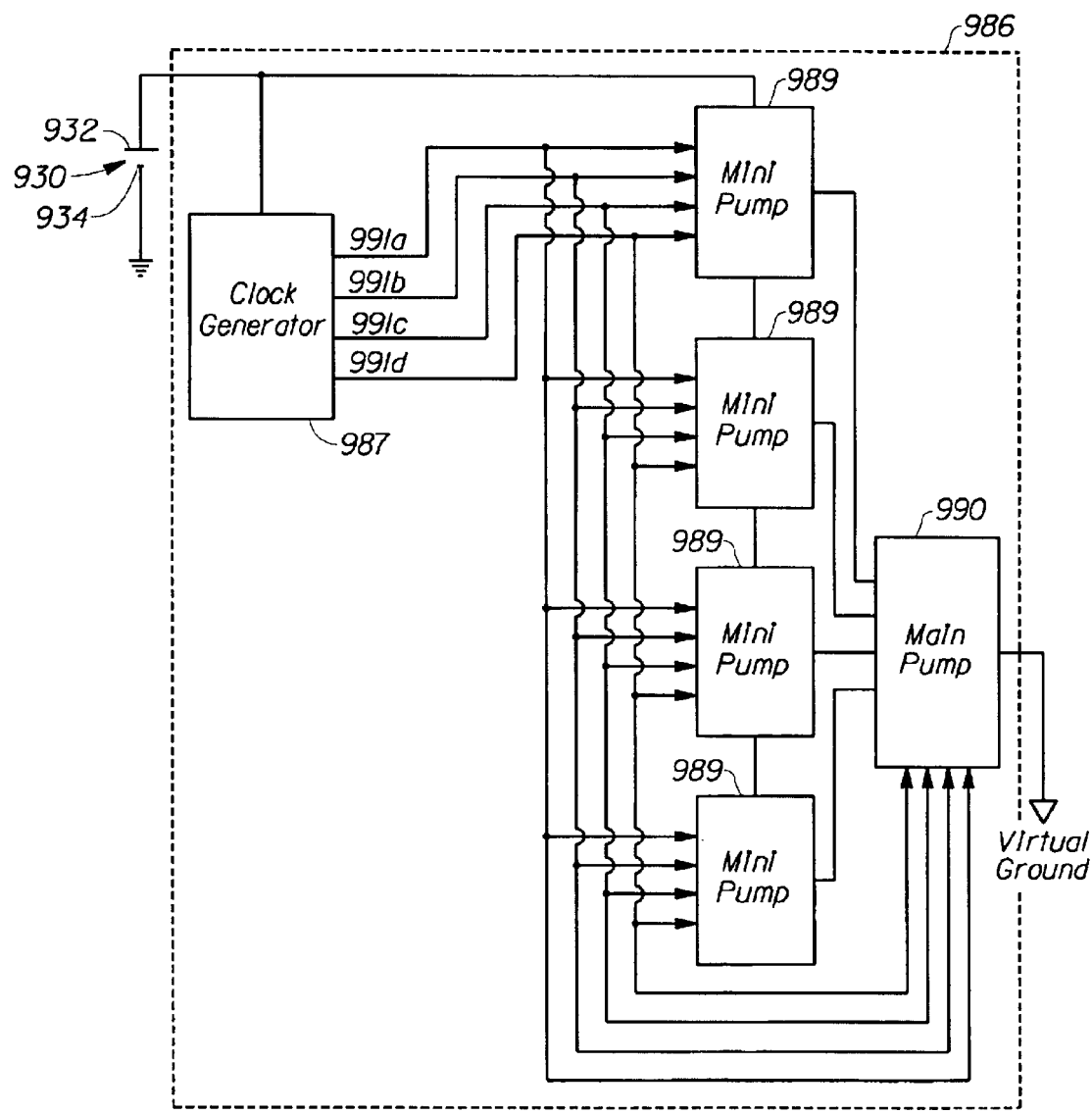
FIG. 9B is a block diagram of yet another preferred embodiment of an aspect of the preferred embodiment of the battery of FIG. 9.

In a preferred embodiment of the present invention, the ground bias circuit 980 includes a charge pump circuit 986. The charge pump circuit 986 is shown in FIG. 9B and includes a clock generator 987, and one or more pumps 988. In a preferred embodiment of the charge pump circuit 986 shown in FIG. 9B, for example, the charge pump includes a two-tiered configuration including four mini-pumps 989, and one main pump 990. Any number of mini-pumps 989, however, may be used. One preferred embodiment of charge pump circuit 986, for example, includes twelve mini-pumps 989 and one main pump. The mini-pumps 989 and the main pump 990 of this embodiment are driven by four different phased control signals, 991a, 991b, 991c, and 991d, generated by the clock generator 987 that each have the same frequency, but are shifted in phase from each other. The control signals 991a through 991d, for example, may be shifted in phase ninety degrees from each other. In this embodiment, each of the mini-pumps 989 provides an inverted output voltage of the controls signals 991a through 991d that are generated by the clock generator. The main pump 990 sums the outputs of the multiple mini-pumps 989 and provides an output signal for the charge pump circuit 986 that is at the same voltage level as the individual output voltages of the mini-pumps 989, but is at a higher current level that is the total of the current provided by all twelve of the mini-pumps 989. This output signal provides the virtual ground for the DC/DC converter 950 and the output negative terminal 922 of the container 912.

In a further aspect of the invention, the charge pump circuit further includes charge pump controller 992 that only turns on the charge pump circuit 986 when the cell voltage drops to a predetermined voltage level in order to minimize losses associated with the charge pump circuit 986. The predetermined voltage for the charge pump controller 992, for example, could be in the range from about the nominal voltage of the electrochemical cell 930 to about the highest cut-off voltage of the group of electronic devices for which the battery 910 is designed to power. The predetermined voltage is more preferably about 0.1 volts greater than the cut-off voltage of the electronic device, with about 0.05 volts greater than the cut-off voltage being the most preferred. Alternatively, the charge pump circuit 986 could be controlled by the same control signal that turns on the DC/DC converter 950 so that the charge pump circuit 986 operates only when the converter 950 is operating.

In addition, both the DC/DC converter 950 and charge pump circuit 986 in a battery having a rechargeable electrochemical cell are preferably turned off when the cell voltage drops to about the optimal discharge depth. This allows the rechargeable electrochemical cell to be optimally discharged in order to allow a maximum number of and efficiency of charge cycles for that cell.

Further, when the ground bias circuit 980 is turned off, the virtual ground, which is applied to the output negative terminal 922 of the container 912, preferably collapses to the voltage level of the negative electrode 934 of the electrochemical cell 930. Thus, when the ground bias circuit 980 is not operating, the battery operates in a standard ground configuration provided by the negative electrode 934 of the electrochemical cell 930.

Alternatively, the ground bias circuit 980 could comprise a second DC/DC converter such as a Buck-Boost converter, a Cuk converter, or a linear regulator. In addition, the DC/DC converter 950 and the ground bias circuit 980 can be combined and replaced by a single converter such as a Buck-Boost converter, a push-pull converter, or a flyback converter that will both shift the positive output voltage up and shift the negative bias down.

Figure 10:
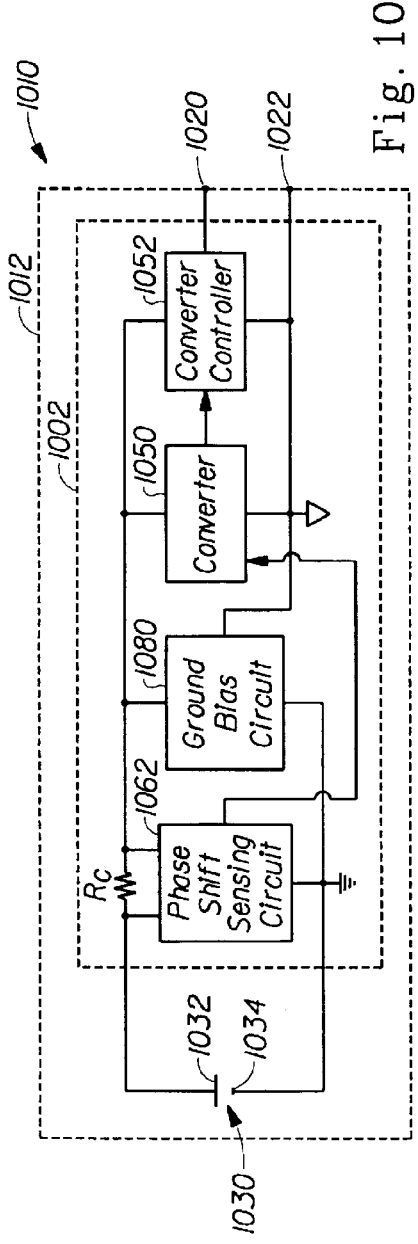
FIG. 10 is a block diagram of yet another preferred embodiment of a battery of the present invention.

FIG. 10 shows yet another embodiment of a discharge sub-controller circuit 1002 of the present invention. In this embodiment, the DC/DC converter 1050 is capable of accepting a correction control signal from an external source such as the phase shift sensing circuit 1062. As described above with reference to FIG. 7, the DC/DC converter 1050 utilizes a control scheme such as a pulse-width modulator to control the operating parameters of the converter 1050. In this embodiment, the discharge sub-controller circuit 1002 includes the same elements as the discharge sub-controller circuit 902 shown in FIG. 9, but further includes a phase shift sensing circuit 1062 that measures the instantaneous phase shift, between the AC components of the cell voltage at electrode 1032 and the current being drawn from the electrochemical cell 1030 measured across current-sensing resistor Rc. The DC/DC converter 1050 uses this signal in combination with other internally or externally generated control signals to generate the duty cycle.

Figure 11:
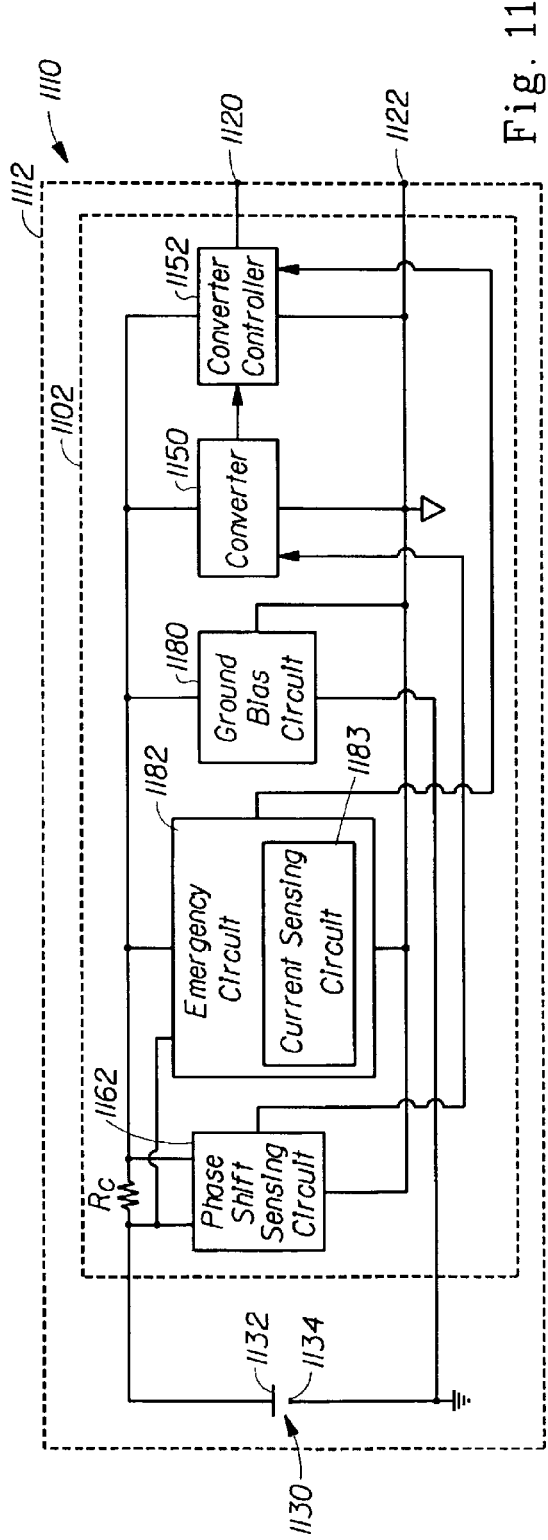
FIG. 11 is a block diagram of another preferred embodiment of a battery of the present invention.

The discharge sub-controller 1102 of the embodiment shown in FIG. 11 may include the same elements as the discharge sub-controller 1002 shown in FIG. 10, but further includes an emergency circuit 1182 electrically connected to both sides of the current-sensing resistor Rc, and to a negative terminal 1122 of the electrochemical cell 1130, and further connected to the converter controller 1152. The emergency circuit 1182 can signal to the converter controller 1152 in response to one or more safety-related conditions requiring disconnect of the electrochemical cell(s) 1130 from the output terminals 1120 and 1122 of the container 1112 to protect the consumer, an electrical or electronic device utilizing the battery 1110, or the electrochemical cell 1130 itself. For example, in the event of a short-circuit or inverse polarity, the emergency circuit 1182 signals the converter controller 1152 to disconnect the electrodes 1132 and 1134 of the electrochemical cell 1030 from the terminals 1120 and 1122 of the container 1112. In addition, the emergency circuit 1182 can also provide an indication of the end of the discharge cycle of the electrochemical cell 1130 to the converter controller 1152 by sensing the voltage and/or the internal impedance of the electrochemical cell 1130. For example, the discharge sub-controller 1102 may ramp down the current when the remaining capacity of the electrochemical cell 1130 falls to a predetermined level, intermittently disconnect and reconnect the electrodes 1132 and 1134 of the electrochemical cell 1130 from the output terminals 1120 and 1122 for a short duration when the remaining capacity of the electrochemical cell 1130 reaches a predetermined value, or provide some other visible, audible or machine-readable indication that the battery is about to shut down. Separately, the emergency circuit 1182 may also be used to provide a controller bypass mode if a current sensing circuit 1183 indicates a steady current rate higher than the controller 1150 can sustain. If this current is within cell 1130 safety margins, the emergency circuit 1182 can sent a signal to converter controller 1152 to connect electrodes 1132 and 1134 of the electrochemical cell 1130 directly to output terminals 1120 and 1122 bypassing the converter 1150. At the end of the discharge cycle, the emergency circuit may also send a signal to the converter controller 1152 to disconnect the electrochemical cell 1130 from the terminals 1120 and 1122 of the container 1112 and/or to short the output terminals 1120 and 1122 to prevent the discharged electrochemical cell 1130 from consuming the current of other cells connected in series with the discharged electrochemical cell 1130.

Figure 12:
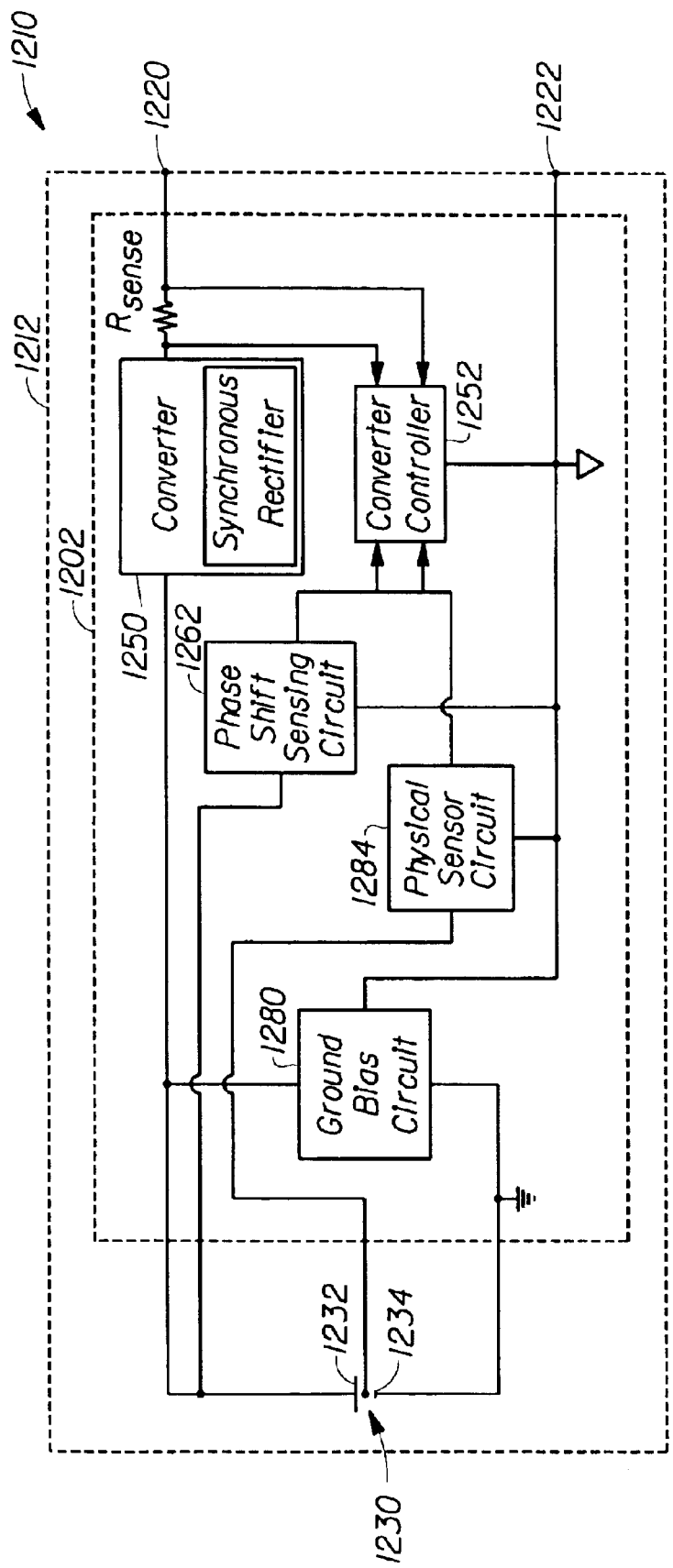
FIG. 12 is a block diagram of yet another preferred embodiment of a battery of the present invention.

A preferred discharge sub-controller 1202 that is shown in FIG. 12 includes a DC/DC converter 1250 having a synchronous rectifier 1274 that can electronically connect and disconnect the positive electrode 1232 from the positive terminal 1220 of the container 1212. The switch of the synchronous rectifier 1274 eliminates the need for an additional switch such as the converter controller 852 in the direct electrical path between the positive 1232 or the negative 1234 electrodes of the electrochemical cell 1230 and the output terminals 1220 and 1222 of the container. Additionally, the synchronous rectifier 1274 increases the efficiency of the DC/DC converter 1250 by reducing the internal losses. The converter controller 1252 of this embodiment also allows for additional input signals for the control of the DC/DC converter 1250. For example, in the embodiment shown in FIG. 12, the converter controller 1252 monitors the internal electrochemical cell environment via sensors (not shown) such as temperature, pressure, and hydrogen and oxygen concentration in addition to the phase shift measurements described earlier with respect to FIG. 10.

FIGS. 7–12 show progressively more complex circuit designs of the present invention. They are given in this order to provide an orderly description of different elements that may be included in a discharge sub-controller circuit in addition to the DC/DC converter that is the central element of the controller of the present invention. The order of presentation is not meant to imply that the elements introduced later in circuits combining multiple different elements must have all the features described with respect to the previous Figures in order to be within the scope of the present invention. An emergency circuit, a charge indicator circuit, a phase sensing circuit, and/or a ground bias circuit, for example, may be used in combination with the circuits of FIGS. 6–11 without the converter controller or other elements shown in the Figures that show these elements.

Figure 13:
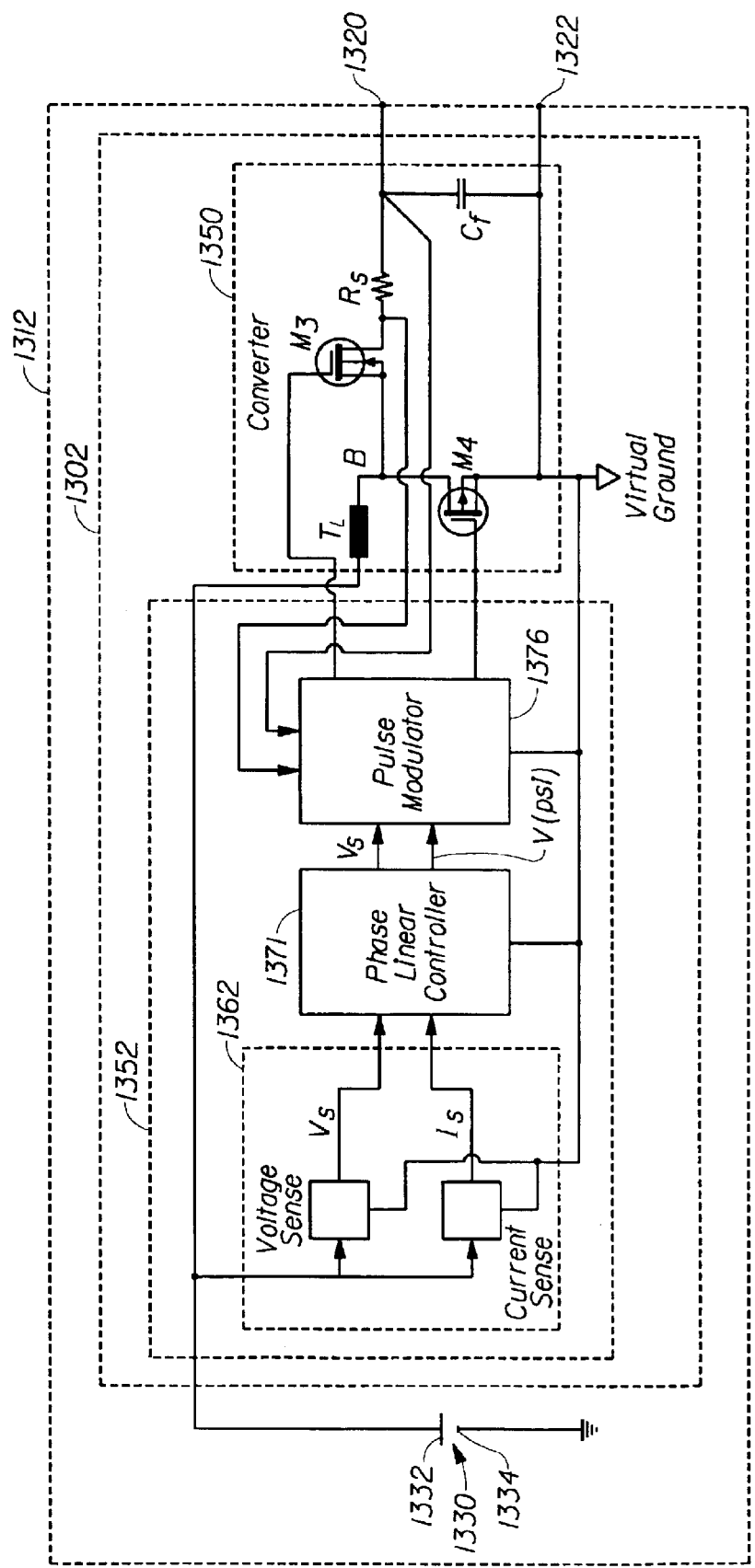
FIG. 13 is a combination of a block and a schematic diagram of another preferred embodiment of a battery of the present invention.

A preferred embodiment of the integrated controller circuit 1340 for use in a battery 1310 of the present invention includes the DC/DC converter 1350 and the converter controller 1352 and is shown in FIG. 13. The converter 1350 is preferably a high efficiency, and medium power converter that can operate below the threshold voltage of most electronic devices. The discharge sub-controller 1302 preferably includes a charge pump such as the one shown in FIG. 9B to supply a virtual ground that has a potential below that of the negative electrode 1334 of the electrochemical cell 1330 to the DC/DC converter 1350 and the output terminal 1322 of the container 1312. The virtual ground provides an increased voltage differential available to drive the DC/DC converter 1350 and allows the converter 1350 to more efficiently draw a higher current level from the electrochemical cell 1330 than it would be able to with only the cell voltage driving the converter.

In this embodiment, the converter controller 1352 preferably utilizes a pulse-width and pulse-phase modulation control scheme. The phase shift sensing circuit 1362 measures the cell voltage and the current drawn from the electrochemical cell 1330 at the positive 1332 and the negative 1334 electrodes of the electrochemical cell 1330 and the instantaneous and/or continuous phase shift between the voltage and the current. This phase shift defines the internal impedance of the electrochemical cell 1330, which is a function of charge capacity of the electrochemical cell 1330. In an alkaline battery, for example, after about 50% discharge of the electrochemical cell 1330, which is determined by the cell closed-circuit voltage drop, the increasing internal impedance indicates the remaining electrochemical cell 1330 capacity. The phase shifting sensing circuit 1362 provides these signals to the phase linear controller 1371. The phase linear controller 1371 then provides the voltage Vs sensed by the phase shift sensing circuit 1362 and an output voltage control signal V(psi) that is linearly proportional to the phase shift to the pulse modulator 1376 that utilizes a combination of pulse-width modulation and pulse-phase modulation control schemes. The pulse modulator 1376 also receives the voltage drop across the resistor Rs as a voltage control signal.

The pulse modulator 1376 uses the voltage control signals in combination to drive the DC/DC converter 1350. When the voltage Vs is above a predetermined threshold voltage level, the pulse modulator 1376 maintains the metal-oxide semiconductor field-effect transistor ("MOSFET") M3 in a closed state and the MOSFET M4 in an open state. Thus, the current path from the electrochemical cell 1330 to the load is maintained via MOSFET M3. In addition, the losses associated with the DC/DC converter 1350 and the converter controller 1352 are minimized because the duty cycle is effectively maintained at zero percent. In this case, the DC losses of the closed MOSFET M3 and the resistor Rs are extremely low. The resistor Rs, for example, is preferably in the range from about 0.01 to about 0.1 ohms.

When the voltage Vs is below a predetermined threshold voltage level, however, the pulse modulator 1376 is turned on and modulates the duty cycle of the DC/DC converter 1350 based upon the combination of the voltage control signals. The amplitude of Vs operates as the primary control signal that controls the duty cycle. The voltage drop across the current sense resistor Rs, or current sensor, which is a function of the output current, operates as the second control signal. Finally, the signal V(psi) generated by the phase linear controller 1371, which is linearly proportional to the phase shift between the AC components of the cell voltage and the current being drawn from the electrochemical cell 1330, is the third control signal. In particular, the V(psi) signal is used to alter the duty cycle in response to the internal impedance changes over the battery run time, which affects the efficiency of the converter and the battery run time. The pulse modulator increases the duty cycle if the instantaneous and/or continuous amplitude of Vs decreases, or if the voltage drop across the resistor Rs increases, and/or the instantaneous and/or continuous amplitude of the V(psi) control signal increases. The contribution of each variable is weighted according to an appropriate control algorithm.

When the pulse modulator 1376 is turned on, its oscillator generates trapezoidal or square wave control pulses that preferably have a 50% duty cycle and a frequency in the range from about 40 KHz to about 1 MHz, more preferably in the range from about 40 KHz to about 600 KHz, with about 600 KHz generally being the most preferred. The pulse modulator 1376 alters the duty cycle of the output control signal for the MOSFETs M3 and M4 utilizing an appropriate control algorithm. Most generally, the control algorithm operates M3 and M4 with the same duty cycle but the opposite phase. The MOSFETs M3 and M4 are preferably complementary high power transistors in which M3 is preferably an N-channel MOSFET, and M4 is preferably a P-channel MOSFET. In essence, the configuration of the complete DC/DC converter 1350 is a boost DC/DC converter with a synchronized rectifier at the output. In addition, the converter 1350 minimizes AC and DC losses by using MOSFET M3 instead of a non-synchronous Schottky diode. Separate control signals drive M3 and the power MOSFET M4. Altering the phase and/or the duty cycle between the M3 and M4 control signals alters the output voltage across the terminals 1320 and 1322 of the container 1312.

The pulse modulator 1376 may control the MOSFETs M3 and M4 based upon one or more voltage control signals such as the voltage VS, the voltage drop across the resistor Rs, or the internal impedance of the electrochemical cell 1330. If the load current consumption is low, for example, the pulse modulator 1376 generates a duty cycle of the DC/DC converter 1350 close to zero percent. If the load current consumption is high, however, the pulse modulator 1376 generates a duty cycle of the DC/DC converter 1350 close to 100%. As the load current consumption varies between these two endpoints the pulse modulator 1376 varies the duty cycle of the DC/DC converter in order to supply the current required by the load.

Figure 14:
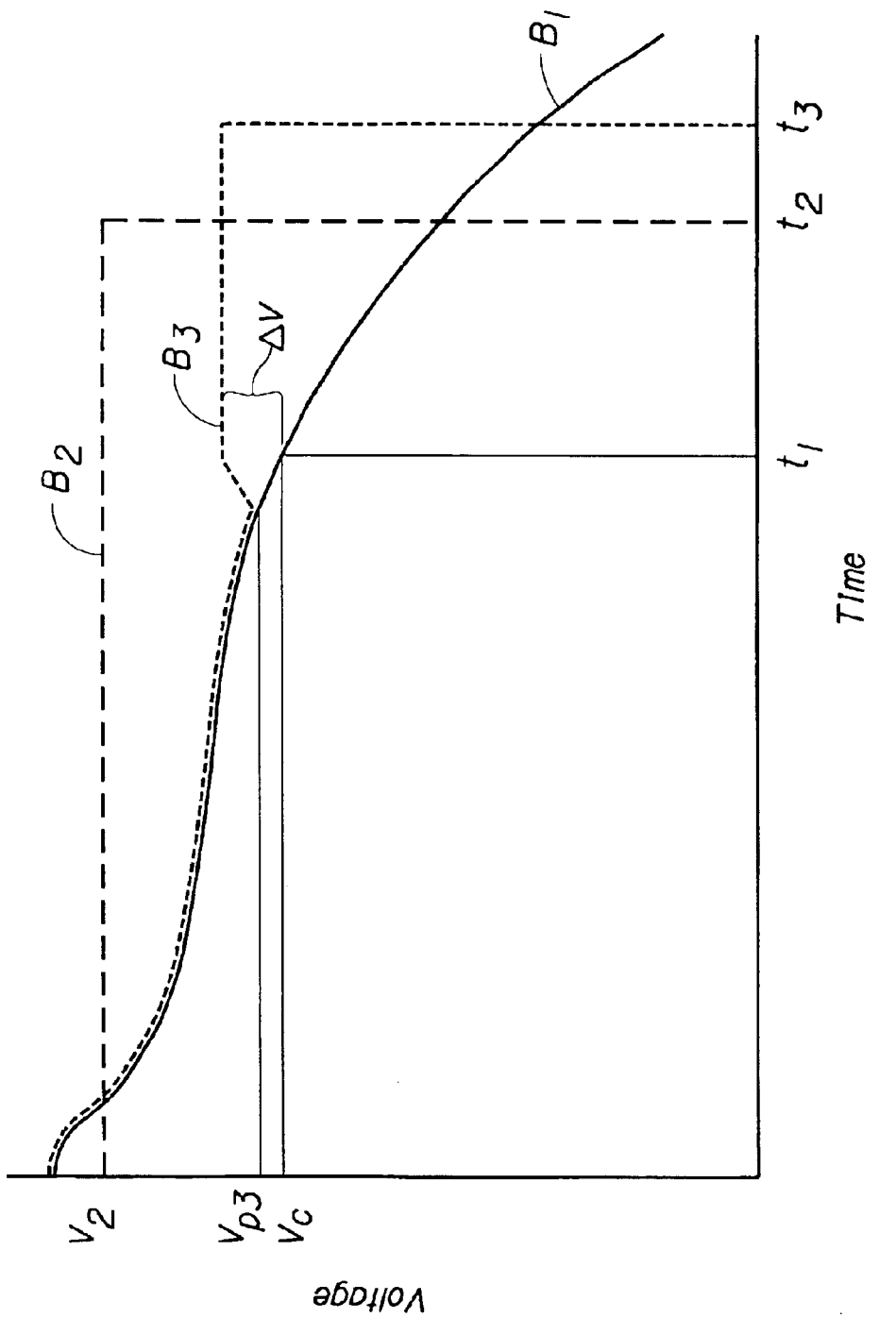
FIG. 14 is a graph of discharge characteristic curves for a typical battery and two different preferred embodiments of batteries of the present invention.

FIG. 14 compares exemplary discharge curves for a battery B1 that does not have a controller of the present invention, a battery B2 of the present invention having discharge sub-controller in which the converter that operates in a continuous mode, and a battery B3 of the present invention, having a discharge sub-controller in which the converter turns on above the cut-off voltage of the battery for a typical electronic device for which that battery is designed. As shown in FIG. 14, the battery B1 that does not have a controller of the present invention will fail in an electronic device that has a cut-off voltage Vc at time t1. The discharge sub-controller of the battery B2, however, continuously boosts the output voltage of the battery to voltage level V2 throughout the run time of the battery. When the cell voltage of the electrochemical cell of battery B2 falls to voltage level Vd, the minimum operating voltage of the discharge sub-controller, the sub-controller of battery B2 will shut down and the battery output voltage drops to zero at time t2, ending the effective run time of the battery B2. As shown in the graph of FIG. 14, the effective run time extension of the battery B2 having a sub-controller in which the converter operates in a continuous mode is t2-t1.

The controller of the battery B3, however, does not begin to boost the output voltage of the battery until the cell voltage of the electrochemical cell reaches a predetermined voltage level Vp3. The predetermined voltage level Vp3 is preferably in the range between the nominal voltage level of the electrochemical cell and the highest cut-off voltage of the class of electronic devices that the battery is intended to power. More preferably, the predetermined voltage level Vp3 is about 0.2 volts greater than the highest cut-off voltage, Vc, of the class of electronic devices that the battery is intended to power. Even more preferably, the predetermined voltage level Vp3 is about 0.15 volts greater than the highest cut-off voltage, Vc, of the class of electronic devices that the battery is intended to power. Yet even more preferably, the predetermined voltage level Vp3 is about 0.1 volts greater than the highest cut-off voltage, Vc, of the class of electronic devices that the battery is intended to power, with about 0.05 volts greater than Vc being the most preferred. When the cell voltage reaches the predetermined voltage level Vp3, the converter of battery B3 begins to boost or stabilize the output voltage to a level of Vc+V. The voltage level V is depicted in FIG. 14 and represents the voltage difference between the boosted output voltage of the battery B3 and the cut-off voltage Vc. The voltage level V is preferably in the range from about 0 volts to about 0.4 volts, with about 0.2 volts being more preferred. Battery B3 then continues to provide an output until the cell voltage of the electrochemical cell falls to voltage level Vd, the minimum operating voltage of the converter, the controller of battery B3 will shut down. At this time, the battery output voltage drops to zero at time t3, ending the effective run time of the battery B3. As shown in the graph of FIG. 14, the effective run time extension of the battery B3 over the battery B1 that does not have a converter of the present invention is t3-t1.

FIG. 14 also shows that the battery B3 will outlast the battery B2 when they are connected to the same electronic device. Because the converter of battery B2 operates continuously, the internal losses of the converter consume some of the energy capacity of the electrochemical cell of battery B2, and, therefore, the cell voltage of battery B2 will reach the minimum operating voltage of the converter Vd in a shorter time compared to the battery B3 in which the controller is operational for only a portion of the discharge cycle. Thus, optimizing the selection of the predetermined voltage Vp3 of battery B3 as close to the cut-off voltage of the electronic device that it is powering will result in the most efficient usage of the electrochemical cell and result in a greater battery run time extension. Thus the predetermined voltage Vp3 of the battery B3 is preferably equal to or slightly greater than the cut-off voltage of the electronic or electric device that it is intended to power. For example, the predetermined voltage Vp3 may preferably be about 0.2 volts greater than the cut-off voltage. More preferably, the predetermined voltage Vp3 may preferably be about 0.15 volts greater than the cut-off voltage. Even more preferably, the predetermined voltage Vp3 may preferably be about 0.1 volts greater than the cut-off voltage, with about 0.05 volts greater than the cut-off voltage being the most preferred.

If the battery is designed as a universal battery for a variety of electronic devices, however, the predetermined voltage Vp3 is preferably selected to be equal to or slightly greater than the highest cut-off voltage of that group of electronic devices. For example, the predetermined voltage Vp3 may preferably be about 0.2 volts greater than the highest cut-off voltage of that group of electronic devices. More preferably, the predetermined voltage Vp3 may preferably be about 0.15 volts greater than the highest cut-off voltage of that group of electronic devices. Even more preferably, the predetermined voltage Vp3 may preferably be about 0.1 volts greater than the highest cut-off voltage of that group of electronic devices, with about 0.05 volts greater than the highest cut-off voltage of that group of electronic devices being the most preferred.

The graphs of FIG. 14 also show that the lower the minimum operating voltage of the converter Vd, the greater the run time extension will be compared to battery B1 that does not have a controller of the present invention. In addition, the greater the difference between the cut-off voltage of the electronic device, Vc, and the minimum operating voltage of the converter, Vd, the controller of the present invention will provide a greater run time extension of the battery due to the boosting of the cell voltage of the electrochemical cell.

Further, FIG. 14 shows that the device cut-off is no longer the limiting factor of the discharge of a primary or rechargeable electrochemical cell. As long as the controller can maintain the output voltage of the battery above the cut-off voltage of the device, the electrochemical cell(s) of the battery may continue to discharge. In a primary battery, this allows the cell(s) to be discharged as completely as possible depending upon the minimum operating voltage of the converter. In a rechargeable battery, however, the present invention allows an optimal discharge that increases the service run time of the rechargeable battery independent of the cut-off voltage of the device as long as the converter is capable of operating at a cell voltage less than or equal to the optimal discharge depth of the rechargeable electrochemical cell.

Charge Sub-Controller

The charge sub-controller 104 may also extend the cycle life of a rechargeable battery of the present invention. The sub-controller may extend the cycle life of the battery by individually controlling the charge sequence for each individual electrochemical cell. Thus, the charge sub-controller may optimize the charge of each cell based on actual feedback from that particular cell in order to maximize the number and efficiency of each charge and discharge cycle. The charge sub-controller may, for example, control the charge of each cell by directly monitoring the cell voltage and/or the internal impedance of each cell. This allows the sub-controller to control the charge cycle of each individual electrochemical cell of multiple single-cell batteries or of one or more multiple-cell batteries.

The charge sub-controller 104 may also extend the run time of a rechargeable battery that is preferably not deeply discharged, such as a lead-acid battery, by charging the electrochemical cell(s) during the "off-time" of the discharge cycle, i.e., when the electrochemical cell is not in a discharge mode. For example, the controller may allow the charge sub-controller to charge any one or more of the individual cell(s) during the "off-time" of the discharge for those cell(s). If the "off-time" is long enough with respect to the "on-time" of the discharge, i.e., when the particular electrochemical cell is actively discharging, the charge sub-controller may be able to maintain the cell in at least a near full-charge condition. If the duty cycle is high enough and the device operates over a sufficient duration that the charge sub-controller is unable to maintain the charge of the electrochemical cell above a predetermined voltage level or below a particular impedance level that corresponds to the maximum desired discharge depth of that type of or that particular electrochemical cell, the discharge sub-controller may end the discharge cycle of the battery when the rechargeable electrochemical cell(s) reach the maximum desired discharge depth. The charge sub-controller may also prevent an overcharge by only charging the cell when the cell voltage is below a certain predetermined voltage level such as the nominal voltage of the cell, by any other method to determine the end of a charge cycle described in this application, or by any other means known in the art. Thus, the controller may optimize the service run time of rechargeable electrochemical cells by not allowing the cell to discharge beyond the optimal discharge depth during the discharge cycle and optimizing the charge sequence during the charge cycle.

Alternate power supplies for the charging cycle may include an external supply such as a power cord of a device or an internal supply such as another electrochemical cell in the device or packaged with the rechargeable electrochemical cell in a hybrid battery. A primary cell, for example may be packaged in the device or along with a rechargeable electrochemical cell in a hybrid battery. A metal-air cell, such as a zinc-air cell that has a high energy density, but is only able to provide relatively low current levels, provides a particularly advantageous alternative power supply that may be used to charge a rechargeable electrochemical cell. Alternatively, an alternative power supply such as a fuel cell may be included in a hybrid battery to provide the charging source for the rechargeable electrochemical cell.

In addition, the charge sub-controller also allows the use of either a contacted charging system or a contact-less isolated charging system to charge a battery of the present invention.

A preferred embodiment of the battery of the present invention may also include a full charge indication to the user. The charge sub-controller, for example, may provide a visible or audible indication to the user that the battery is fully charged. Alternatively, the sub-controller may provide a charger system or device readable indication so that the charger system or the device could warn the user accordingly.

Figure 15:
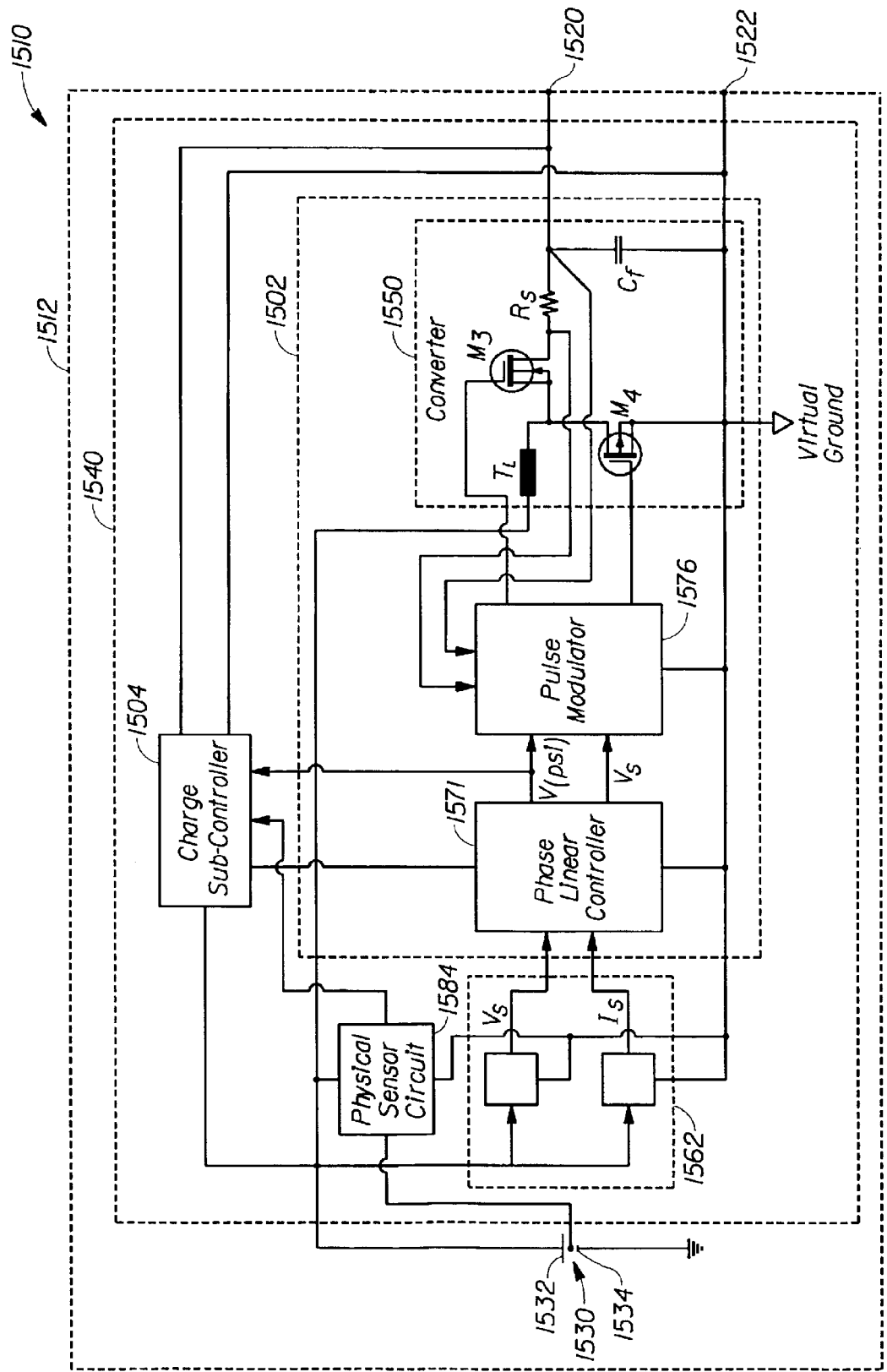
FIG. 15 is a combination of a block and schematic diagram of yet another preferred embodiment of a battery of the present invention.

FIG. 15 shows a block diagram of a battery of the present invention that includes a charge sub-controller circuit 1504. The charge sub-controller circuit 1504 is preferably integrated into the battery 1510 and is responsible to safely and efficiently control an incoming power signal from an external charging source or circuit in order to optimize the charge cycle of the rechargeable electrochemical cell 1530. The charge sub-controller circuit 1504 controls the incoming power signal from the external charging source based upon input voltage control signals received from the sensing circuit 105 and/or feedback from its own internal sensing circuitry. For example, the charge sub-controller 1504 could use the voltage control signal, V(psi), that defines the internal impedance of the electrochemical cell 1530. This control signal is generated by the phase linear controller 1571 and is described with respect to FIG. 13. Alternatively, the charge sub-controller may control the charging of the electrochemical cell 1530 by the cell voltage or the charging current, or by a combination of two or more of the internal impedance, the cell voltage and the charging current. In addition, physical conditions measured within the container 1512 of the battery 1510 such as hydrogen concentration, oxygen concentration, temperature and/or pressure may be used by the charge sub-controller to optimally charge the electrochemical cell 1530.

When the voltage at the terminals 1520 and 1522 is higher than the cell voltage of the electrochemical cell 1530, the pulse modulator 1576 of the discharge sub-controller 1502 closes N-channel MOSFET M3 and opens P-channel MOS- FET M4. MOSFET M3 creates a current path from the terminals 1520 and 1520 to charge the electrochemical cell 1530, and MOSFET M4 prevents a short circuit between the terminals 1520 and 1522. The pulse modulator 1576 may also turn off the ground bias circuit 1580 by sending a voltage control signal to the clock generator 1587 of the ground bias circuit 1580. In the charge pump example of FIG. 9A, for instance, the clock generator 987 will open switches S1 and S2, and close switches S3 and S4, collapsing the virtual ground output to the potential of the negative electrode 934 of the electrochemical cell 930. Alternatively, if the ground bias circuit 1580 includes an internal controller such as a charge pump controller 1592 that operates as described with respect to the charge pump controller 992 of FIG. 9B, the internal controller may directly compare the voltage of the terminals 1520 and 1522 to the cell voltage of the electrochemical cell 1530 and shut off the ground bias circuit 1580 if the voltage across the terminals 1520 and 1522 is greater than the cell voltage of the electrochemical cell 1530 by directly controlling the clock generator 1587. This will collapse the virtual ground output to the potential of the negative electrode 1534 of the electrochemical cell 1530.

In a preferred embodiment of the present invention, the charge sub-controller circuit 1504 uses the internal impedance information to determine the most efficient AC signal profile including the amplitude, the frequency, falling and rising edges, etc. The sub-controller thus minimizes the internal charging dynamic and static losses of the electrochemical cell and provides the control for the fastest possible charging rate for the particular electrochemical cell. In addition, physical condition sensors such as hydrogen and oxygen concentration, temperature, pressure, etc. may provide the ability to further optimize the charging conditions.

When the charge sub-controller circuit 1504 determines that the electrochemical cell has been fully charged, the charge sub-controller opens N-channel MOSFET M3. This disconnects the electrochemical cell 1530 from the terminals 1520 and 1522 of the container 1512 and, thereby, from the external charging source or circuit.

Utilization of the internal impedance to control of the charging of the electrochemical cell 1530 allows charge optimization based upon the true ionic and electro-impedance conditions of the electrochemical cell 1530. By placing a charge sub-controller 1504 in each container 1512 provides more control of the individual electrochemical cells 1530 of multiple single-cell batteries or of a multiple-cell battery because the sub-controllers individually control the charging of each cell. The cells 1530 may be charged in a series and/or a parallel configuration with other electrochemical cells 1530. If the cells are charged in series, the charge sub-controller 1504 may include a high impedance path between the terminals so that when the electrochemical cell 1530 is fully charged, the sub-controller 1504 may shunt the charging current to the other cells connected in series with that cell 1530. If the cells are connected in parallel, however, the charge sub-controller 1504 may disconnect the electrochemical cell 1504 from the charging current. Placing a controller in each electrochemical cell of a multiple-cell battery allows each cell to be charged by the same charging current, which is controlled by the individual controllers in each cell to optimally charge that cell, regardless of the electrochemistry of that cell. This charge sub-controller may also charge multiple cells of a hybrid battery even when the cells have different nominal voltages.

Figure 16:
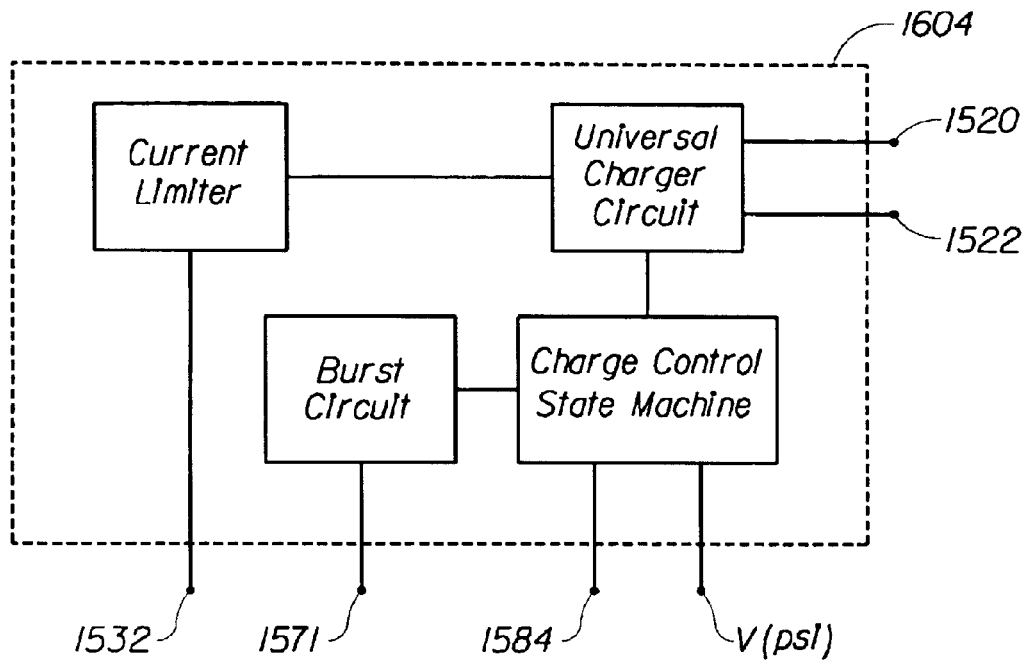
FIG. 16 is a block diagram of one embodiment of a charge sub-controller as depicted in FIG. 15.

FIG. 16 shows one embodiment of a charge sub-controller circuit 1504 configuration that may be used in a battery of the present invention as shown in FIG. 15. In this embodiment, the charge sub-controller circuit 1604 includes a universal charger circuit 1677, a burst circuit 1678, and a charge control state machine 1679. The charge control state machine 1679 uses burst circuit 1678 to create a test current, Is, and the test voltage, Vs, at the electrodes 1532 and 1534 of the electrochemical cell 1530. As described with reference to FIG. 13, the phase linear controller 1571 detects the phase shift between the test current, Is, and the test voltage, Vs. The burst circuit 1678 preferably includes a burst driver 1668 and a n-channel MOSFET M1. The burst driver 1668 produces a high frequency control pulse signal, which drives the gate of the MOSFET M1. The test current, Is, flows through the MOSFET M1, and the phase linear controller 1571 detects the phase shift angle ( ) between the test current, Is, and the test voltage, Vs. The phase linear controller 1571 outputs the voltage control signal V(psi), which is linearly proportional to the phase shift between the AC components of the cell voltage and the current being drawn from the electrochemical cell 1530, to the charge control state machine 1679. The charge control state machine 1694 uses this control signal from the phase linear controller 1571 to control the AC charge signal profile. When the electrochemical cell 1530 is fully charged, the pulse modulator 1576 disconnects MOSFET M3, which in turn disconnects the electrochemical cell 1530 from the terminals 1520 and 1522 of the container 1512.

Figure 17:
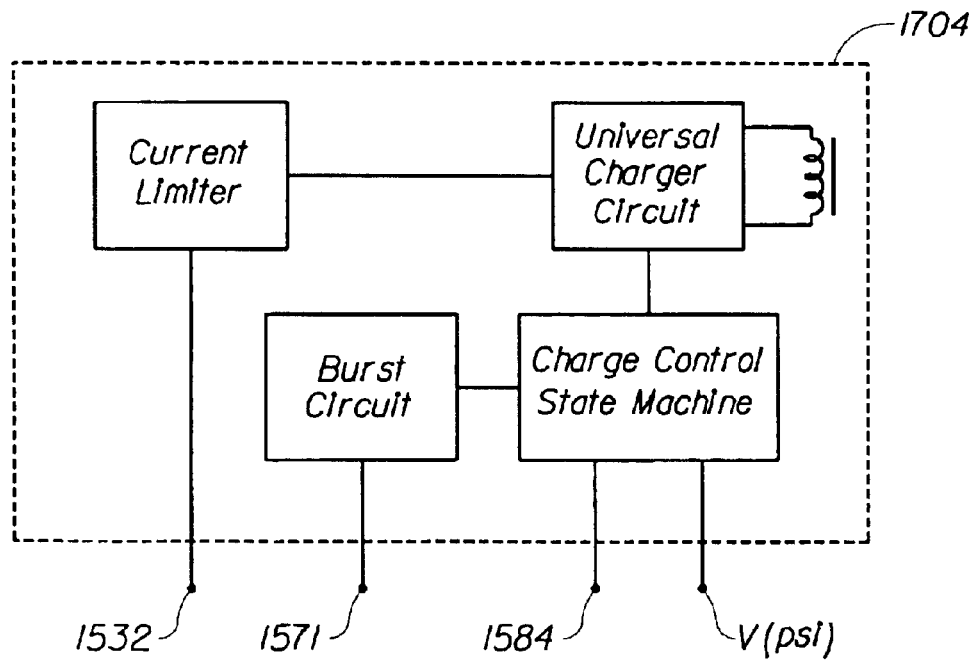
FIG. 17 is a block diagram of another embodiment of a charge sub-controller as depicted in FIG. 15.

FIG. 17 shows an alternative embodiment of the charge sub-controller circuit shown in FIG. 15 that allows an isolated charging of the electrochemical cell 1530 without any mechanical contacts between the external charger circuit and the battery 1510 of the present invention. In this embodiment, the charge sub-controller circuit 1704 includes a coil that acts as the secondary coil of a transformer to charge the electrochemical cell 1530. The external charge source includes a primary coil of the transformer that may be coupled in a wireless connection through the air to the secondary coil of the charge sub-controller circuit 1704. A battery of the present invention, for example, may contain a printed wire coil on the label of the battery 1510 or may be contained within the container, or the battery to form the secondary coil of the charging transformer. The charging circuit of this embodiment preferably operates at a frequency in the range from about 20 KHz to about 100 KHz, more preferably in the range from about 40 KHz to 60 kHz, with about 50 KHz being the most preferred. The signal from the external charging source energizes the secondary coil 1798 of the charge sub-controller circuit 1704 via the primary coil of the external charging source. The charging control state machine 1794 controls the universal charger circuit 1777 in order to optimize the charge cycle of the rechargeable electrochemical cell 1530. If the external charger circuit operates at a frequency of about 50 KHz, the transformer would have a sufficient range to allow charging of the electrochemical cell from about 1 to about 3 inches from the battery of the present invention, and would thus allow an in situ charging of the electrochemical cell without removing the battery from the electric or electronic device. This can provide a distinct benefit over batteries that must be removed from a device. A battery in a surgically implanted device such as a pacemaker, for example, may be charged without surgically removing the battery from the patient.

Emergency Sub-Controller

The controller may also perform an emergency function that disconnects the electrochemical cell from the terminals of the container of the battery in the event that one or more safety-related conditions is detected and/or connects the electrochemical cell directly to the output terminals bypassing the converter if the demanded current by the load exceeds converter capabilities yet is within the operating current range for the particular electrochemical cell. The controller may include an independent emergency sub-controller that detects unsafe conditions such as a short-circuit, an inverse polarity, overcharge, over-discharge, high temperature, pressure or hydrogen concentration and electronically disconnects the electrochemical cell from the terminals of the battery. Alternatively, the emergency functions may be performed by the circuitry of the discharge sub-controller and/or the charge sub-controller, or the controller may include separate sensing circuitry that signals the discharge sub-controller and/or the charge sub-controller to disconnect the electrochemical cell from the terminals of the battery.

What is claimed is:

1. A battery having a controller suitable for use in batteries including a primary battery and a secondary battery, said battery comprising:
    (a) a container having a positive and negative terminal;
    (b) a battery cell having an internal impedance disposed within said container, said cell having a positive electrode, a negative electrode, and a cell voltage measured across positive and negative electrodes of said cell;
    (c) a controller adapted for use in primary and secondary batteries electrically coupled between said electrodes of said cell and said terminals of said container to form, from the cell voltage, an output voltage across the positive and negative terminals of the container; and
    (d) a circuit responsive to a predetermined condition of said battery, the circuit begin operable to uncouple the output voltage of the controller from the terminals of the container upon detection of said predetermined conditions substantially determined by said internal impedance reaching a predetermined impedance level.

2. The battery of claim 1 wherein said circuit is part of the controller and is operable for uncoupling the output voltage of the controller from said positive and negative terminals of the container upon detection of said predetermined condition.

3. The battery of claim 1 wherein said circuit includes a current sensor coupled with said cell to measure a cell current, the circuit being responsive to a predetermined condition including an inverse polarity condition based upon the current sensor, and uncoupling the output voltage of the controller from the container terminals upon detection of the predetermined condition.

4. The battery of claim 1 wherein said circuit includes a current sensor coupled with said cell to measure a cell current, the circuit being responsive to a predetermined condition including a short circuit condition based upon the current sensor, and uncoupling the output voltage of the controller from the container terminals upon detection of the predetermined condition.

5. The battery of claim 1 wherein said circuit is operable for monitoring the cell voltage, the circuit being responsive to a predetermined condition including the cell voltage dropping below a predetermined voltage level, the circuit uncoupling the output voltage of the controller from the container terminals upon detection of the predetermined condition to generally prevent an over-discharge of the cell.

6. The battery of claim 1 wherein said circuit is operable for monitoring the cell internal impedance, the circuit being responsive to a predetermined condition including the cell internal impedance exceeding a predetermined impedance, the circuit uncoupling the output voltage of the controller from the container terminals upon detection of the predetermined condition to generally prevent an over-discharge of the cell.

7. The battery of claim 1 wherein said circuit is operable for monitoring the cell voltage, the circuit being responsive to a predetermined condition including the cell voltage exceeding a predetermined voltage level, the circuit uncoupling the output voltage of the controller from the container terminals upon detection of the predetermined condition to generally prevent an over-charge off the cell.

8. The battery of claim 1 wherein said container has an internal pressure, said circuit is operable for monitoring the pressure within said container, the circuit being responsive to a predetermined condition including the container pressure exceeding a pressure limit, the circuit uncoupling the output voltage of the controller from the container terminals upon detection of the predetermined condition.

9. The battery of claim 1 wherein said circuit is operable for monitoring a hydrogen concentration within said container, the circuit being responsive to a predetermined condition including the container hydrogen concentration exceeding a hydrogen limit, the circuit uncoupling the output voltage of the controller from the container terminals upon detection of the predetermined condition.

10. The battery of claim 1 wherein said circuit is operable for monitoring a temperature within said container, the circuit being responsive to a predetermined condition including the container temperature exceeding a temperature limit, the circuit uncoupling the output voltage of the controller from the container terminals upon detection of the predetermined condition.

11. The battery of claim 1 wherein said predetermined condition includes the condition wherein the current demand of a load attached to the battery exceeds the capabilities of the controller, the circuit being further operable, upon uncoupling the output voltage of the controller from the terminals of the container, to couple the cell directly to said container terminals to form the cell voltage at the container terminals.

12. A multiple-cell battery comprising:
    a first container having a positive terminal and a negative terminal;
    a first battery cell having a first internal impedance disposed within said first container, said first battery cell having a positive electrode, a negative electrode, and a battery cell voltage measured across said positive and said negative electrodes of the first battery cell;
    a first controller electrically coupled between the electrodes of said first battery cell and the terminals of said first container to create a first container output voltage measured across said first container positive and negative terminals;
    a second container electrically coupled to said first container, said second container having a positive terminal and a negative terminal, wherein said positive terminal of said second container is connected to said negative terminal of said first container;
    a second battery cell having a second internal impedance disposed within said second container, said second battery cell having a positive electrode, a negative electrode, and a battery cell voltage measured across said positive and said negative electrodes of the second battery cell;
    a second controller electrically coupled between said electrodes of said second battery cell and said terminals of said second container to create a second container output voltage measured across said second container positive and negative terminals; and a circuit responsive to a predetermined condition of said multiple cell battery substantially determined by said first internal impedance and said second internal impedance reaching predetermined impedance levels, the circuit being electrically coupled to one of the first and second controllers to uncouple the respective one of the first and second container output voltages from the terminals of the respective one of the first and second containers upon detection of said predetermined condition.

13. The multiple cell battery of claim 12 wherein said circuit includes a current sensor coupled with at least one cell to measure the current of that j cell, the circuit being responsive to a predetermined condition including an inverse polarity condition based upon the current sensor, and uncoupling the output voltage of the controller from the container terminals associated with that cell upon detection of the predetermined condition.

14. The multiple cell battery of claim 12 wherein said circuit includes a current sensor coupled with at least one cell to measure the current of that cell, the circuit being responsive to a predetermined condition including a short circuit condition based upon the current sensor, and uncoupling the output voltage of the controller from the container terminals associated with that cell upon detection of the predetermined condition.

15. The multiple cell battery of claim 12 wherein said circuit is operable for monitoring a cell voltage of at least one of the cells, the circuit being responsive to a predetermined condition including the cell voltage dropping below a predetermined voltage level, the circuit uncoupling the output voltage of the controller from the container terminals associated with that cell upon detection of the predetermined condition to generally prevent an over-discharge of the cell.

16. The multiple cell battery of claim 12 wherein said circuit is operable for monitoring a cell internal impedance of at least one of the cells, the circuit being responsive to a predetermined condition including the cell internal impedance exceeding a predetermined impedance, the circuit uncoupling the output voltage of the controller from the container terminals associated with that cell upon detection of the predetermined condition to generally prevent an over-discharge of the cell.

17. The multiple cell battery of claim 12 wherein said circuit is operable for monitoring a cell voltage of at least one of the cells, the circuit being responsive to a predetermined condition including one of the cell voltage exceeding a predetermined voltage level, the circuit uncoupling the output voltage of the controller from the container terminals associated with that cell upon detection of the predetermined condition to generally prevent an over- charge of the cell.

18. The multiple cell battery of claim 12 wherein said circuit is operable for monitoring a pressure within at least one of said containers, the circuit being responsive to a predetermined condition including the container pressure exceeding a pressure limit, the circuit uncoupling the output voltage of the controller from the container terminals associated with that container upon detection of the predetermined condition.

19. The multiple cell battery of claim 12 wherein said circuit is operable for monitoring a hydrogen concentration within at least one of the containers, the circuit being responsive to a predetermined condition including the container hydrogen concentration exceeding a hydrogen limit, the circuit uncoupling the output voltage of the controller from the container terminals associated with that container upon detection of the predetermined condition.

20. The multiple cell battery of claim 12 wherein said circuit is operable for monitoring a temperature within at least one of the containers, the circuit being responsive to a predetermined condition including one of the container temperature exceeding a temperature limit, the circuit uncoupling the output voltage of the controller from the container terminals upon detection of the predetermined condition.

21. The multiple cell battery of claim 12 wherein said battery is attached to a load having a current demand and each of said controllers has a capability to create a minimum output voltage, said predetermined condition includes the condition wherein the current demand of the load attached to the multiple cell battery exceeds the capabilities of at least one of the controllers to create a minimum output voltage, the circuit being further operable, upon uncoupling the output voltage of the controller from the terminals of the container, to couple at least one of the cells directly to said respective container terminals to form the cell voltage at the respective container terminals.

22. The multiple call battery of claim 12, further comprising a housing having an output negative terminal electrically coupled to said second container negative terminal, said first container negative terminal electrically connected to said second container positive terminal, said housing substantially containing said first and second container.

23. The multiple call battery of claim 12, wherein at least one of the said first and second battery cells comprises one of an electrochemical cell and a voltaic cell.

24. A method for extending the useful life of a battery comprising the steps of:

providing a battery having a controller adapted for use in batteries including a primary battery and a secondary battery, said battery including:

(i) a container having a positive terminal and a negative terminal; and (ii) a battery cell having an internal impedance disposed within said container; said cell having a positive electrode, a negative electrode, and a cell voltage measured across said positive and said negative electrodes of said cell;

the method being characterized by;

electrically coupling a controller between said electrodes of said cell and said terminals of said container to form, from the cell voltage, an output voltage across the positive and negative terminals of the container;

in response to detection of a predetermined condition of the battery substantially determined by said internal impedance reaching a predetermined impedance level, uncoupling the output voltage of the controller from the terminals of the container.

25. The method of claim 25, wherein sensing a predetermined condition includes sensing a cell current exceeding a predetermined current level.

26. The method of claim 25, further comprising upon uncoupling the voltage of the controller from the terminals of the container, electrically coupling said positive electrode to said positive terminal and said negative electrode to said negative terminal.

27. The method of claim 24, wherein sensing a predetermined condition includes sensing a cell voltage being one of below and over-discharge voltage and above an overcharge voltage.

* * * * *